United States Patent
Inagaki et al.

(10) Patent No.: US 8,414,238 B2
(45) Date of Patent: Apr. 9, 2013

(54) STUD BOLT, STUD BOLT ATTACHMENT STRUCTURE, AND BOOSTER DEVICE USING THE SAME

(75) Inventors: Shinichi Inagaki, Saitama (JP); Toru Sato, Saitama (JP); Nobuyuki Yamashita, Saitama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 12/301,391

(22) PCT Filed: May 28, 2007

(86) PCT No.: PCT/JP2007/060779
§ 371 (c)(1),
(2), (4) Date: Nov. 18, 2008

(87) PCT Pub. No.: WO2007/139048
PCT Pub. Date: Dec. 6, 2007

(65) Prior Publication Data
US 2009/0184569 A1  Jul. 23, 2009

(30) Foreign Application Priority Data

May 30, 2006  (JP) ................................. 2006-149594
Apr. 26, 2007  (JP) ................................. 2007-116420

(51) Int. Cl.
*F16B 37/04* (2006.01)
(52) U.S. Cl. ....................................... 411/180; 411/107
(58) Field of Classification Search .................. 411/181, 411/107, 116, 177, 188, 424, 180
See application file for complete search history.

(56) References Cited

U.S. PATENT DOCUMENTS

| 1,960,734 | A | * | 5/1934 | Fassinger ....................... 411/424 |
| 2,001,290 | A | * | 5/1935 | Thomson ..................... 411/371.1 |
| 2,056,688 | A | * | 10/1936 | Peterka et al. ................ 411/399 |
| 3,699,637 | A | * | 10/1972 | Rosiek .......................... 29/432.1 |
| 4,797,022 | A | * | 1/1989 | Crigger ........................ 403/408.1 |
| 4,827,756 | A | * | 5/1989 | Crigger ............................ 72/377 |
| 5,619,900 | A | | 4/1997 | Kullmann et al. |
| 6,190,102 | B1 | * | 2/2001 | Vignotto et al. .............. 411/399 |
| 7,172,379 | B2 | * | 2/2007 | Kawatani et al. ............. 411/107 |
| 2006/0159545 | A1 | | 7/2006 | Humpert et al. |

FOREIGN PATENT DOCUMENTS

| DE | 19641611 A1 | 4/1997 |
| GB | 2100379 A | 12/1982 |
| JP | 4123964 | 4/1992 |
| JP | 83327 B2 | 1/1996 |
| JP | 2002536607 | 10/2002 |
| JP | 2004255893 A | 9/2004 |

* cited by examiner

*Primary Examiner* — Gary Estremsky
(74) *Attorney, Agent, or Firm* — Michael Best & Friedrich LLP

(57) ABSTRACT

A stud bolt (1) is disposed with a bolt head portion (2), a bolt shoulder portion (3) whose diameter is smaller than the diameter of the bolt head portion (2), and a thread portion (4*b*) whose diameter is smaller than the diameter of the bolt shoulder portion (3), wherein the bolt shoulder portion (3) includes a knurling portion (3*b*) that includes projecting portions (3*b*1) and groove portions (3*b*2) on its outer periphery and at least part of which eats into a container (10) during staking and a bolt base portion (3*a*) that is disposed between the knurling portion (3*b*) and the bolt head portion (2) and has a peripheral surface that is smoother than the knurling portion (3*b*).

12 Claims, 18 Drawing Sheets

STUD BOLT, STUD BOLT ATTACHMENT STRUCTURE, AND BOOSTER DEVICE USING THE SAME

TECHNICAL FIELD

The present invention belongs to the technical field of a stud bolt and particularly belongs to the technical field of a stud bolt which, with respect to a container where there is a difference in air pressure between inside and outside, penetrates the container to join together the container and another member in a state where hermetic seal is held, a stud bolt attachment structure, and a booster device using the same.

BACKGROUND ART

Conventionally, there have been instances where a stud bolt is used when attaching a container to another member in a state where hermetic seal is held. For example, in brake booster devices, there is a brake booster device where shaft portions of bolts are caused to penetrate to the outside from the insides of a front shell and a rear shell, each of the bolts is fixed to each of the shells by staking, the brake booster device is attached to a vehicle body by the bolt that has been attached to the rear shell, and a master cylinder is attached to the brake booster device by the bolt that has been attached to the front shell.

Additionally, as that structure, as shown in FIG. 26, there is a structure where convex portions 105 and recessed portions 106 are numerously formed on a head portion end surface 103 of a bolt 101 around a bolt shaft portion 102, the bolt shaft portion 102 is inserted from one side surface side thereof through a through-hole 109 that is drilled in an attachment plate 108 such that part of the bolt shaft portion 102 is caused to plastically deform from the other side surface side, the bolt 101 is attached and fixed to the attachment plate 108 so as to be held between that plastically deformed portion 107 and the head portion end surface 103, the convex portions 105 are caused to eat into the attachment plate 108 such that the convex portions 105 are caused to project further than the head portion end surface 103 and are formed, a stopper portion 104 that includes a flat surface with substantially the same height as that of the head portion end surface 103 is disposed between those convex portions 105, and the recessed portions 106 are formed between the convex portions 104 and the stopper portion 104 (see Patent Document 1).

Further, as shown in FIG. 27, conventionally, as a stud bolt 201, there is a stud bolt of a structure where a bolt head portion 202 is integrally formed on one end, a bolt shaft portion 204 extends on the other end, and a knurling portion 203b is formed vertically excluding a staked portion 203c of a shoulder portion 203 that is formed between the bolt head portion 202 and the bolt shaft portion 204.
Patent Document 1: JP-B-8-3327

DISCLOSURE OF THE INVENTION

Problem that the Invention is to Solve

However, in the configuration of the invention described in Patent Document 1, the structure of the bolt 101 is complicated and its manufacture is difficult, and there have been instances where the strength of the convex portions 105 is relatively weak and the convex portions 105 end up deforming. Further, during the staking process, there have been instances where the bolt deforming portion 107 and the attachment plate 108 interfere with each other such that the bolt 101 ends up slanting without being completely inserted.

Further, when the stud bolt shown in FIG. 27 is applied instead of the bolt shown in FIG. 26, during the staking process there have been instances where projecting portions 203b1 of the knurling portion 203b do not all eat into an attachment container 210 and, as shown in FIG. 28, groove portions 203b2 of the knurling portion 203b that are close to the bolt head portion 202 end up remaining in a state where there is a gap such that the hermetic seal of the attachment container 210 is not held because of that gap.

The present invention has been made in view of these circumstances, and it is an object thereof to provide a stud bolt which, with respect to a container where there is a difference in air pressure between inside and outside, is for penetrating the container to join together the container and another member, alleviates variations in joint strength, has high-precision hermetic seal, alleviates the percentage of defects, improves productivity and is cost-effective, a stud bolt attachment structure, and a booster device using the same.

Means for Solving the Problem

In order to solve the aforementioned problem, the present invention is a stud bolt which, with respect to a container where there is a difference in pressure between inside and outside, is for penetrating the container to join together the container and another member, the stud bolt being disposed with a bolt head portion, a bolt shoulder portion whose diameter is smaller than the diameter of the bolt head portion, and a thread portion whose diameter is smaller than the diameter of the bolt shoulder portion, wherein the bolt shoulder portion includes a knurling portion that includes projecting portions and groove portions on its outer periphery and at least part of which eats into the container during staking and a bolt base portion that is disposed between the knurling portion and the bolt head portion and has a peripheral surface that is smoother than the knurling portion.

Further, the height of the bolt base portion is smaller than the height to a chamfered portion of a hole that is formed in the container and which the stud bolt penetrates.

Further, the container comprises a first member and a second member, and the height of the bolt base portion is larger than the plate thickness of a staking portion of the second member and smaller than the plate thickness of a staking portion of the container.

Further, the container comprises a first member and a second member, the height of the bolt base portion is smaller than the height to a chamfered portion of a hole that is formed in the container and which the stud bolt penetrates, and the bolt shoulder portion is larger than the plate thickness of a staking portion of the container.

Further, the container is a shell of a booster device.

Further, the container is a shell of a booster device, and the first member is a front shell of the booster device.

Further, the second member is a support plate of the booster device.

Moreover, the present invention is a stud bolt attachment structure having a stud bolt which, with respect to a container where there is a difference in pressure between inside and outside, is for penetrating the container to join together the container and another member, the stud bolt being disposed with a bolt head portion, a bolt shoulder portion whose diameter is smaller than the diameter of the bolt head portion, and a thread portion whose diameter is smaller than the diameter of the bolt shoulder portion, wherein the bolt shoulder portion includes a knurling portion that includes projecting portions and groove portions on its outer periphery and at least part of which eats into the container during staking and a bolt base portion that is disposed between the knurling portion and the bolt head portion and whose diameter gradually becomes larger from the knurling portion side to the bolt head portion side, the container includes a first member and a second member, the first member and the second member are disposed with holes that the stud bolt penetrates, the diameter of the hole in the first member is formed so as to be substantially the same as or slightly larger than the diameter of the knurling portion, and the diameter of the hole in the second member is formed so as to be substantially the same as or slightly larger than the diameter of the bolt base portion on the bolt head portion side.

Further, the stud bolt attachment structure includes a gap between the hole in the second member and the bolt base portion, and the first member becomes caught in the gap during the staking.

Moreover, the present invention is a booster device that uses the stud bolt attachment structure, wherein the first member is a front shell of the booster device, and the second member is a support plate.

Effects of the Invention

In the stud bolt that is configured in this manner, during the staking process, the projecting portions of the knurling portion eat into the container and the bolt base portion fills most of the gap between itself and the container, so hermetic seal of the container is ensured. Further, the manufacturing process does not change that much, costs also do not change from what has conventionally been the case, and performance can be improved.

Moreover, the stud bolt that has this high-precision hermetic seal is used in the booster device, so both the manufacturing process and costs do not change that much from what has conventionally been the case, and the performance of the booster device improves.

Further, in the stud bolt attachment structure, the gap between the stud bolt, the first member and the second member becomes substantially uniform on the circumference of a circle, preliminary work such as welding for alignment becomes unnecessary, productivity improves, and low costs can be realized.

Further, the gap between the stud bolt, the first member and the second member is placed so as to become substantially uniform on the circumference of a circle, whereby a force that is substantially uniform on the circumference of a circle acts during the work of staking such that a substantially uniform joining force can be obtained, variations in joint strength can be alleviated such that stable hermetic seal can be ensured, the percentage of defects decreases, and productivity improves. Further, because the first member becomes caught in the gap between the second member and the bolt base portion of the stud bolt and is fastened during the work of staking, joint strength becomes larger.

Moreover, the stud bolt attachment structure that has this high-precision hermetic seal is used in the booster device, so both the manufacturing process and costs do not change that much from what has conventionally been the case, and the performance of the booster device improves.

BEST MODES FOR IMPLEMENTING THE INVENTION

Figure 1:
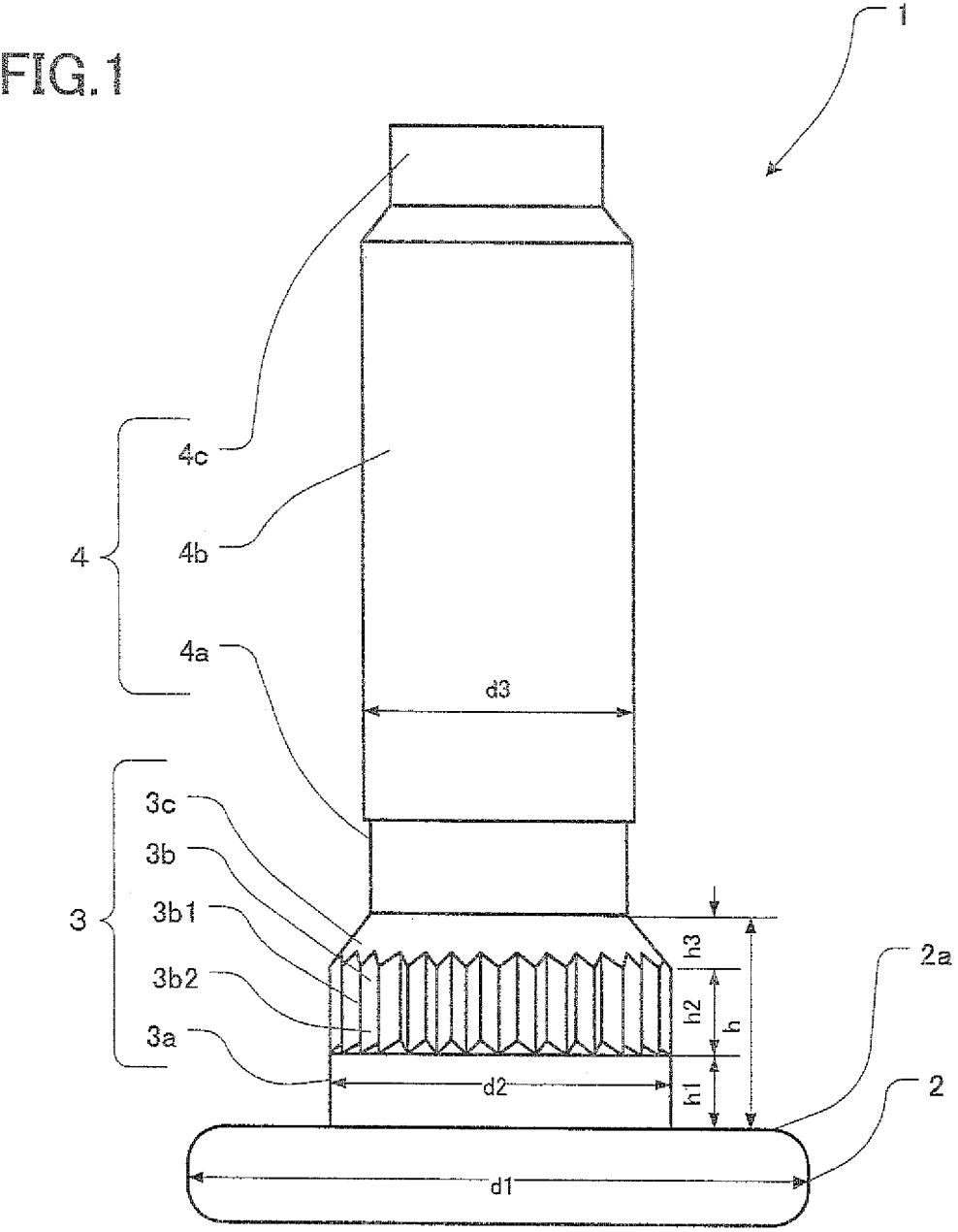
FIG. 1 A diagram showing a first embodiment of a stud bolt pertaining to the present invention.
Figure 2A:
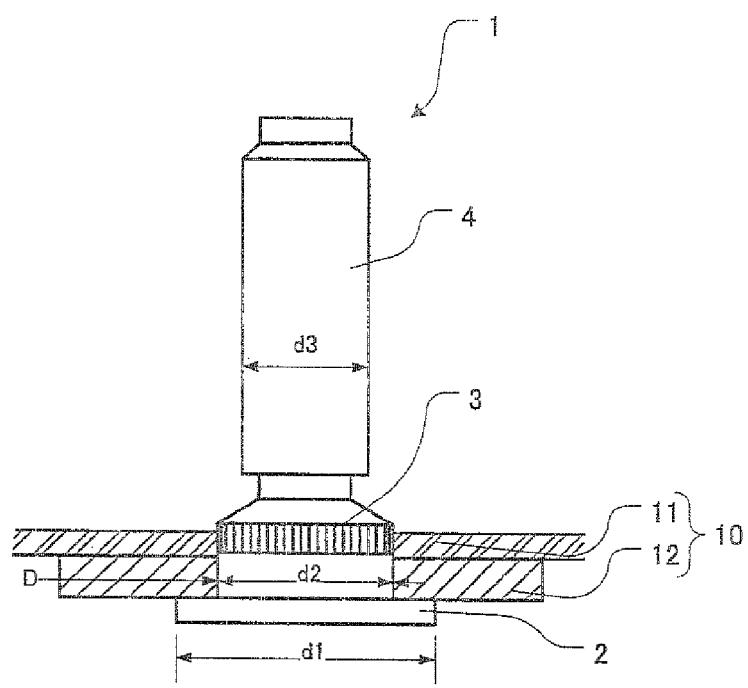
FIG. 2 Diagrams showing a state where the stud bolt of the first embodiment has been set in a container.
Figure 2B:
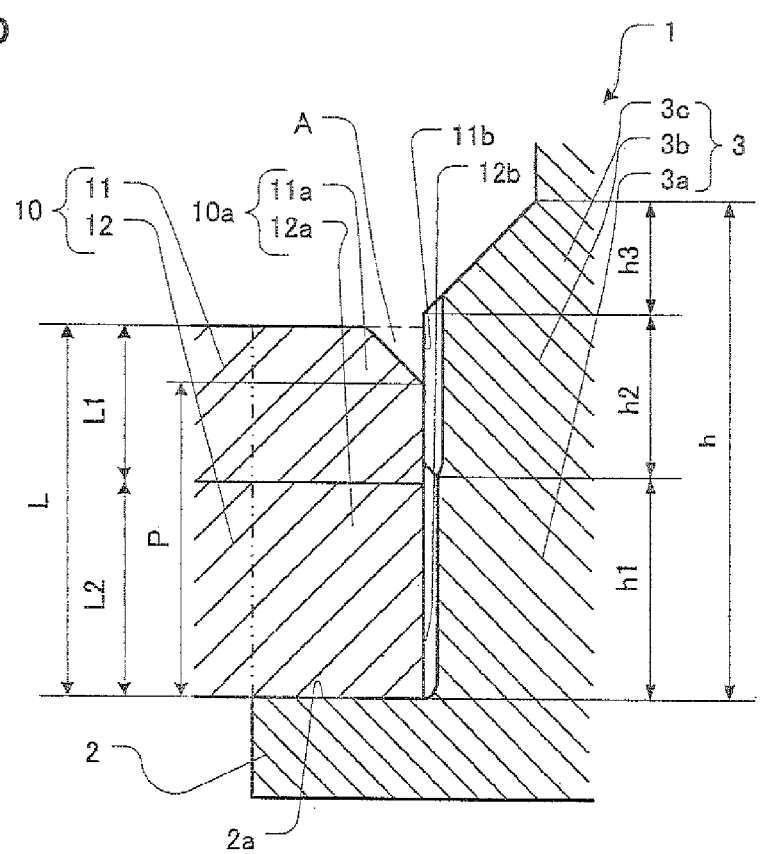

Below, embodiments of the present invention will be described using the drawings. FIG. 1 is a diagram showing a stud bolt pertaining to a first embodiment of the present invention. In the drawing, 1 is the stud bolt, 2 is a bolt head portion, 2a is a stopper portion, 3 is a bolt shoulder portion, 3a is a bolt base portion, 3b is a knurling portion, 3c is a staking portion, 4 is a bolt shaft portion, 4a is a coupling portion, 4b is a thread portion, and 4c is an end portion.

The stud bolt 1 is disposed with the bolt head portion 2 on one end and the bolt shaft portion 4 on the other end, with the bolt shoulder portion 3 being interposed in the middle, and the stud bolt 1 is integrally formed. The bolt head portion 2 has a diameter d1 that is larger than the diameters of the bolt shoulder portion 3 and the bolt shaft portion 4 and includes, on the bolt shoulder portion 3 side, the stopper portion 2a that fulfills the role of a stopper during attachment.

The bolt shoulder portion 3 has a height h, includes, on its outer peripheral surface on the bolt head portion 2 side, the bolt base portion 3a with a height h1, includes the knurling portion 3b with a height h2 that is adjacent to the bolt base portion 3a, and includes the staking portion 3c with a height h3 that is adjacent to the knurling portion 3b. Further, a diameter d2 of the bolt shoulder portion 3 is of a size that is between the diameters of the bolt head portion 2 and the bolt shaft portion 4. The knurling portion 3b is formed such that projecting portions 3b1 and groove portions 3b2 are alternately juxtaposed across the entire circumference, and it is particularly preferable for the knurling portion 3b to be one where there are about 52 of the projecting portions 3b1 and the groove portions 3b2. It will be noted that the bolt shoulder portion 3 may also be configured such that the staking portion 3c is not disposed and such that the knurling portion 3b is directly staked.

The bolt shaft portion 4 is joined to the bolt shoulder portion 3 and includes the coupling portion 4a, the thread portion 4b and the end portion 4c from the bolt shoulder portion 3 side, and a diameter d3 of the thread portion 4b is smaller than the diameters of the bolt head portion 2 and the bolt shoulder portion 3.

FIG. 2 to FIG. 5 are diagrams showing a process of staking the stud bolt 1 of the structure in FIG. 1 to a container 10 that comprises a first member 11 and a second member 12 and the like. FIG. 2(a) shows a state where the stud bolt 1 has been set in the container 10, and FIG. 2(b) shows a diagram where part thereof has been enlarged. A staking portion 10a of the container 10 is a portion with a plate thickness L that comprises the first member 11 and the second member 12. A staking portion 11a of the first member 11 is a plate-shaped portion with a plate thickness L1, and a hole 11b with an inner diameter D that is slightly larger than the diameter d2 of the bolt shoulder portion 3 of the stud bolt 1 and smaller than the diameter d1 of the bolt head portion 2 is formed therein. There is a chamfered portion A on the upper side of the hole 11b in FIG. 2(b).

A staking portion 12a of the second member 12 is a plate-shaped portion with a plate thickness L2, and a hole 12b with an inner diameter D that is slightly larger than the diameter d2 of the bolt shoulder portion 3 of the stud bolt 1 and smaller than the diameter d1 of the bolt head portion 2 is formed therein.

First, as shown in FIG. 2, the stud bolt 1 is inserted into the holes 11b and 12b that are formed in the first member 11 and the second member 12 of the container 10 of this structure. The stud bolt 1 is inserted as far as the bolt shoulder portion 3 that has the diameter d2 that is slightly smaller than the inner diameter D of the holes 11b and 12b in the first member 11 and the second member 12 and stops when it abuts against the stopper portion 2a of the bolt head portion 2 that has a diameter that is larger than the inner diameter D of the holes 11b and 12b in the first member 11 and the second member 12.

At this time, because the height h of the bolt shoulder portion 3 and particularly, in the case of the present embodiment, the combined height h1+h2 of the bolt base portion 3a and the knurling portion 3b of the bolt shoulder portion 3 is larger than the plate thickness L of the container 10, the staking portion 3c of the bolt shoulder portion 3 penetrates the container 10 and projects. Further, the height h1 of the bolt base portion 3a of the bolt shoulder portion 3 is set to be larger than the plate thickness L2 of the second member 12 and smaller than the plate thickness L1+L2 of the first member 11 and the second member 12, that is, the plate thickness L of the container 10. Moreover, a height P from the lower end of the container 10 in FIG. 2 to the chamfered portion A, that is, the portion that is not chamfered, is set to be larger than the height h1 of the bolt base portion 3a of the bolt shoulder portion 3.

Figure 3:
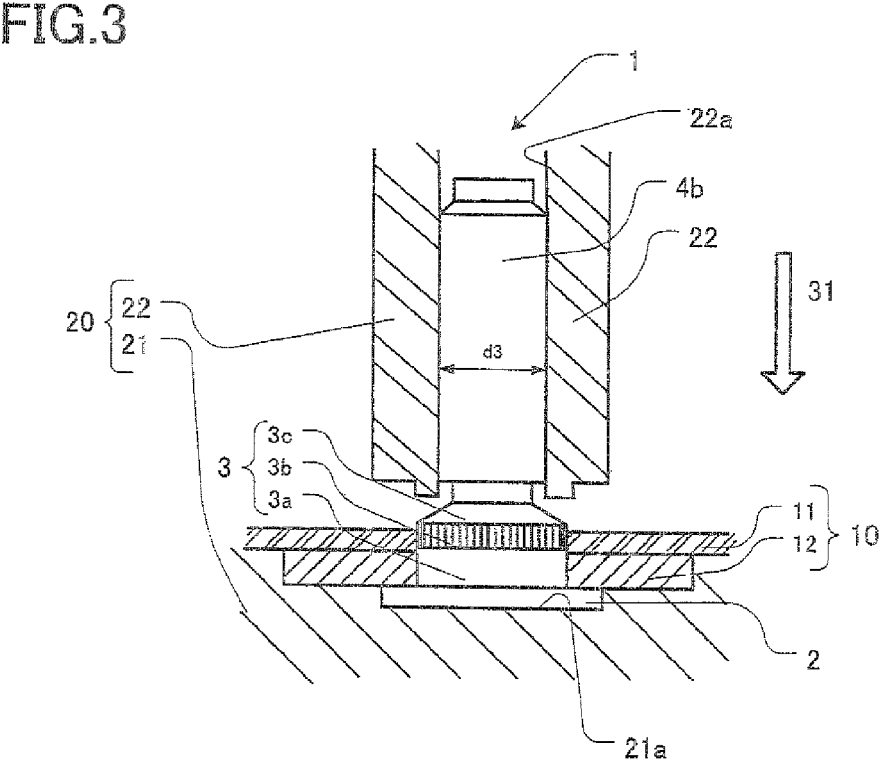
FIG. 3 A diagram showing a state before the stud bolt of the first embodiment is staked.

In this state, as shown in FIG. 3, the container 10 is set, in a state where the stud bolt 1 has been inserted therethrough, in a staking jig 20 that includes a first mold member 21 and a second mold member 22. The first mold member 21 includes a recessed portion 21a that corresponds to the shape of the bolt head portion 2 of the stud bolt 1, and when the container 10 is to be set, the bolt head portion 2 of the stud bolt 1 is placed in, so as to fit together with, this recessed portion 21a. The second mold member 22 includes a cylindrical recessed portion 22a that is slightly larger than the diameter d3 of the thread portion 4b formed on the bolt shaft portion 4 of the stud bolt 1 and has a depth that is longer than the height of the bolt shaft portion 4, and when the container 10 is to be set, the bolt shaft portion 4 of the stud bolt 1 is placed in, so as to fit together with, this recessed portion 22a.

Figure 4:
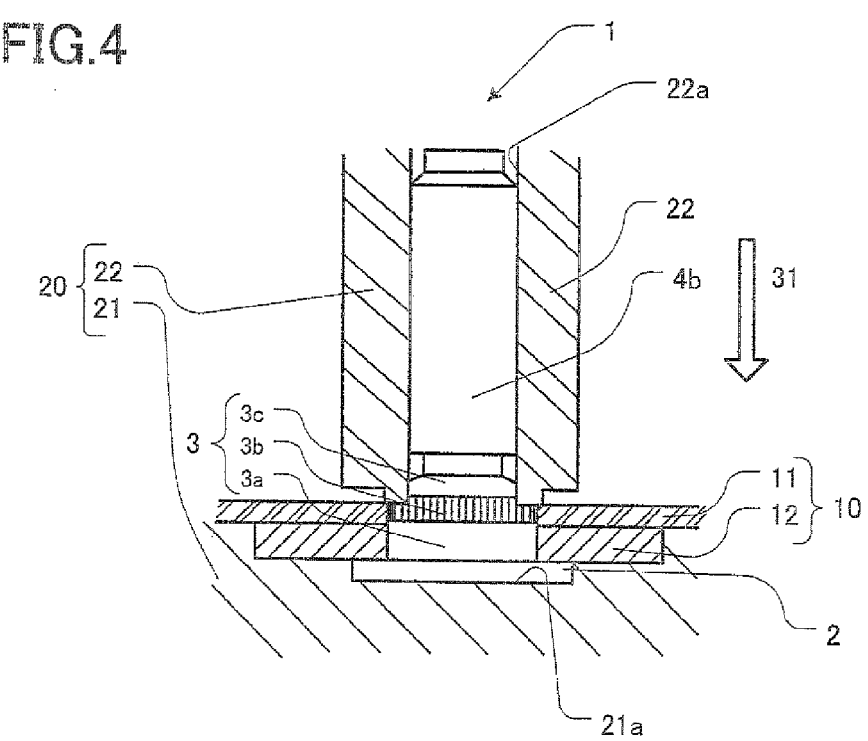
FIG. 4 A diagram showing a state where the stud bolt of the first embodiment is being staked.

Next, as shown in FIG. 4, the second mold member 22 is moved in the direction of arrow 31 such that the distal end of the second member 22 is pushed against and stakes the staking portion 3c formed on the bolt shoulder portion 3 of the stud bolt 1. When this happens, part of the knurling portion 3b and the staking portion 3c formed on the bolt shoulder portion 3 are crushed by the second mold member 22 such that they become flared on the outer periphery of the bolt shoulder portion 3.

Figure 5A:
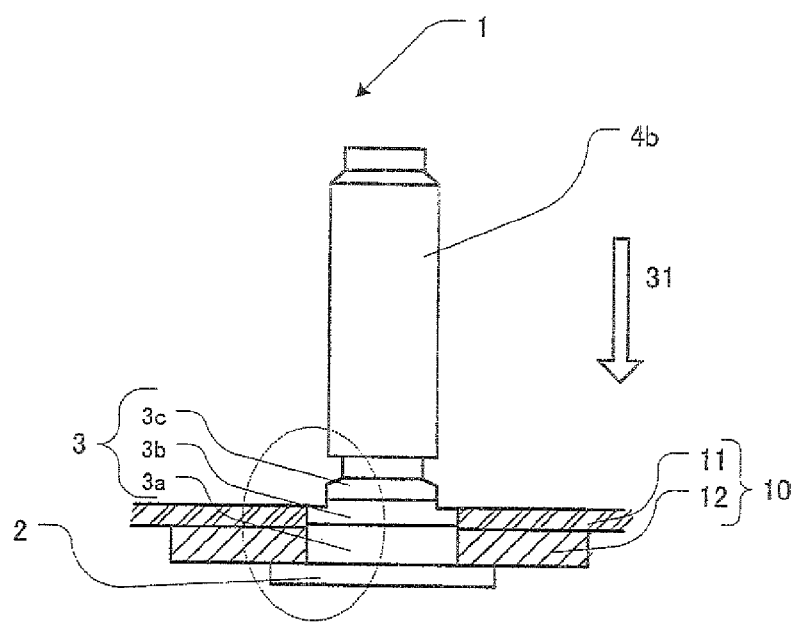
FIG. 5 Diagrams showing a state after the stud bolt of the first embodiment has been staked.
Figure 5B:
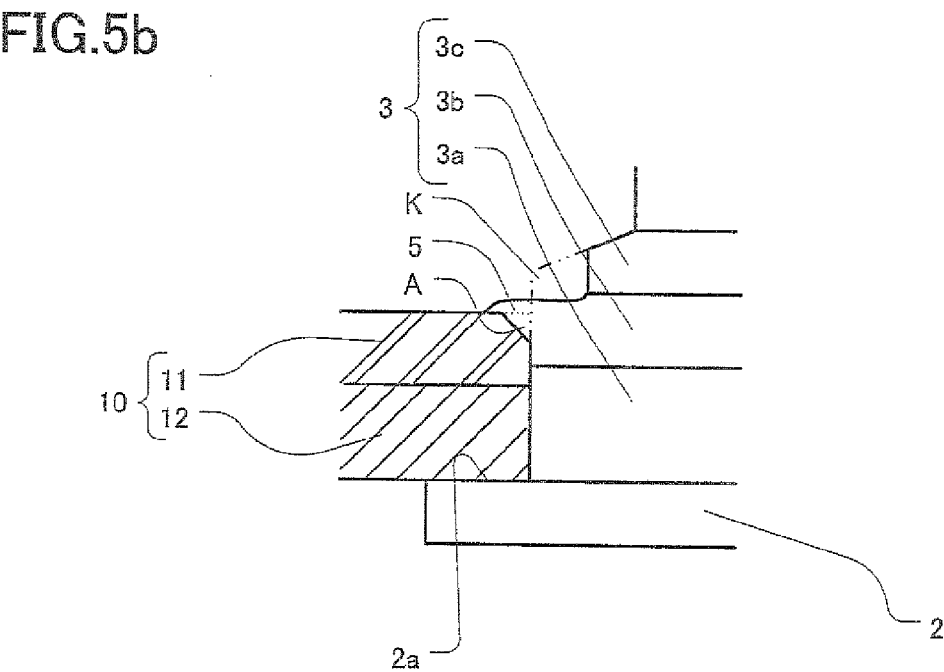

FIG. 5(a) is a diagram showing a state after staking where the stud bolt 1 and the container 10 have been removed from the staking jig 20 after the second mold member 22 has been further moved in the direction of arrow 31 until the second mold member 22 abuts against the first member 11, and FIG. 5(b) is an enlarged diagram of the staked portion indicated by the dotted line in FIG. 5(a). In this state, a projecting piece 5 that has been formed from part of the knurling portion 3b and the staking portion 3c eats into the first member 11 such that the container 10 is held between the projecting piece 5 and the stopper portion 2a of the bolt head portion 2. At this time, the remaining portion of the knurling portion 3b is crushed, whereby its diameter becomes larger than the diameter D of the hole 11b in the first member 11 and the projecting portions 3b1 of the knurling portion 3b eat into the first member 11 to deter rotation of the stud bolt 1. Further, the bolt base portion 3a is also crushed, whereby its diameter becomes larger and the gap between itself and the second member 12 virtually disappears.

Further, the volume of a portion K that deforms by staking the portion of the bolt shoulder portion 3 that projects from the container 10 is set to be larger than the volume of the chamfered portion A.

In this manner, the bolt head portion 2 side of the stud bolt 1 that corresponds to the inside of the container 10 and the end portion 4c side of the bolt shaft portion 4 of the stud bolt 1 that corresponds to the outside of the container 10 are isolated from each other such that the container 10 can be held in a sealed state.

Figure 6:
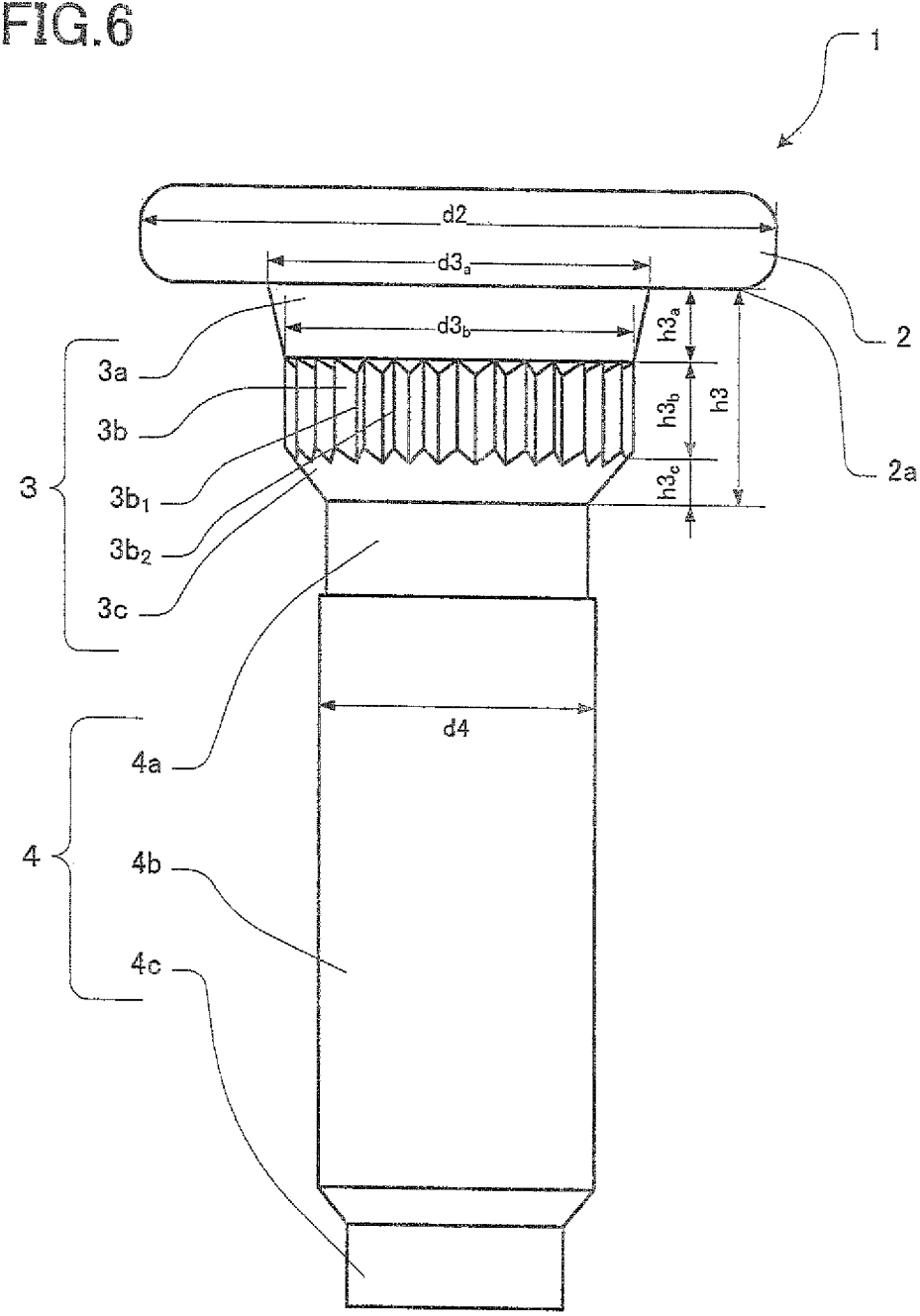
FIG. 6 A diagram showing a second embodiment of the stud bolt pertaining to the present invention.

FIG. 6 is a diagram showing a stud bolt pertaining to a second embodiment of the present invention. In the drawing, 1 is the stud bolt, 2 is a bolt head portion, 2a is a stopper portion, 3 is a bolt shoulder portion, 3a is a bolt base portion, 3b is a knurling portion, 3c is a staking portion, 4 is a bolt shaft portion, 4a is a coupling portion, 4b is a thread portion, and 4c is an end portion.

The stud bolt 1 is disposed with the bolt head portion 2 on one end and the bolt shaft portion 4 on the other end, with the bolt shoulder portion 3 being interposed in the middle, and the stud bolt 1 is integrally formed. The bolt head portion 2 has a diameter d2 that is larger than the diameters of the bolt shoulder portion 3 and the bolt shaft portion 4 and includes, on the bolt shoulder portion 3 side, the stopper portion 2a that fulfills the role of a stopper during attachment.

The bolt shoulder portion 3 has a height h3, includes, on its outer peripheral surface on the bolt head portion 2 side, the bolt base portion 3a with a height h3, that is formed in a tapered shape or the like that gradually becomes larger from a diameter $d3_b$ on the knurling portion side to a diameter $d3_a$ on the bolt head portion side, includes the knurling portion 3b with a height $h3_b$ and a diameter $d3_b$ that is adjacent to the bolt base portion 3a, and includes the staking portion 3c with a height h3, and a knurling portion side diameter $d3_b$ that is adjacent to the knurling portion 3b and which is formed in a tapered shape or the like that gradually becomes smaller such that the diameter on the bolt shaft portion side becomes the same as the diameter of the coupling portion 4a. Further, the diameter $d3_a$ and the diameter $d3_b$ are of sizes that are between the diameters of the bolt head portion 2 and the bolt shaft portion 4. The knurling portion 3b is formed such that projecting portions $3b_1$ and groove portions $3b_2$ are alternately juxtaposed across the entire circumference, and it is particularly preferable for the knurling portion 3b to be one where there are about 52 of the projecting portions 3b1 and the groove portions $3b_2$. It will be noted that the bolt shoulder portion 3 may also be configured such that the staking portion 3c is not disposed and such that the knurling portion 3b is directly staked.

The bolt shaft portion 4 is joined to the bolt shoulder portion 3 and includes the coupling portion 4a, the thread portion 4b and the end portion 4c from the bolt shoulder portion 3 side, and a diameter d4 of the thread portion 4b is smaller than the diameter of the bolt head portion 2.

FIG. 7 to FIG. 13 are diagrams showing a first example of a process of staking the stud bolt 1 of the structure in FIG. 6 to a container 10 that comprises a first member 11 and a second member 12 and the like.

Figure 7:
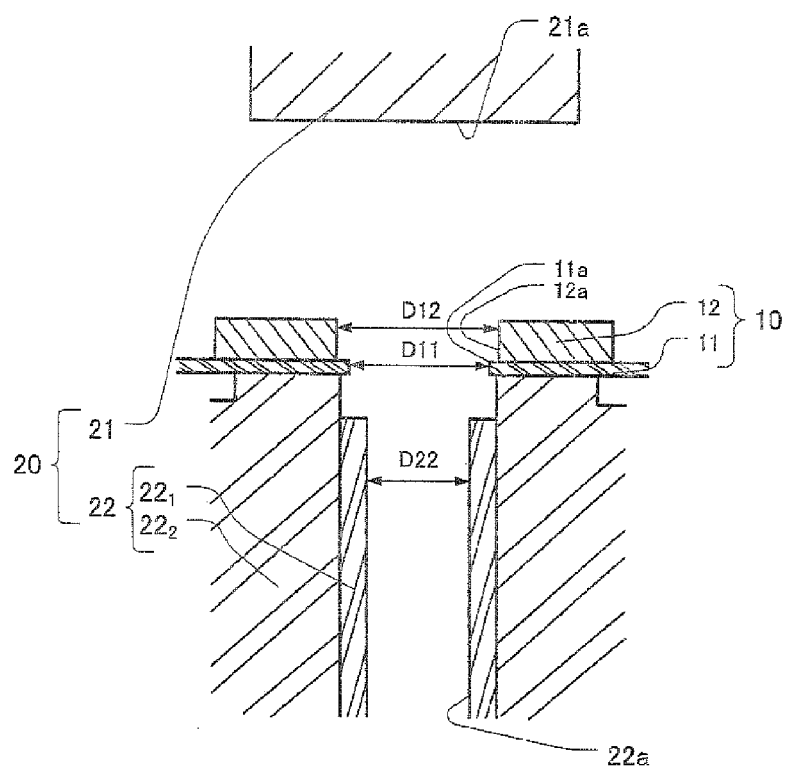
FIG. 7 A diagram that is a first example of a stud bolt attachment structure and shows a state where the stud bolt of the second embodiment has been set in the container.

FIG. 7 shows a state where the container 10 has been set on a second mold member 22.

The second mold member 22 includes a fixed second mold member $22_1$, which includes a recessed portion 22a that is a cylindrical space that is slightly larger than the diameter d4 of the thread portion 4b formed on the bolt shaft portion 4 of the stud bolt 1 and has a depth that is longer than the height of the bolt shaft portion 4, and a movable second mold member $22_2$ on the outside of the fixed second mold member $22_1$. It will be noted that, in the present example, the upper surface of the movable second mold member $22_2$ is formed in a convex shape, but it may also be a flat surface.

Further, the first member 11 and the second member 12 are respectively disposed with holes 11a and 12a that the stud bolt 1 penetrates, and the hole 11a in the first member 11 and the hole 12a in the second member 12 are formed so as to be larger than the diameter d4 of the thread portion 4b formed on the bolt shaft portion 4.

First, the first member 11 is set on the second mold member 22, and then the second member 12 is set on the first member 11. When setting the container 10, it is not necessary to strictly align the container 10; it suffices to set the container 10 such that there is an opening of a dimension that is at least equal to or greater than d4 through which the stud bolt 1 can be inserted. Further, it is also not necessary to perform temporary fixing such as welding.

Figure 8:
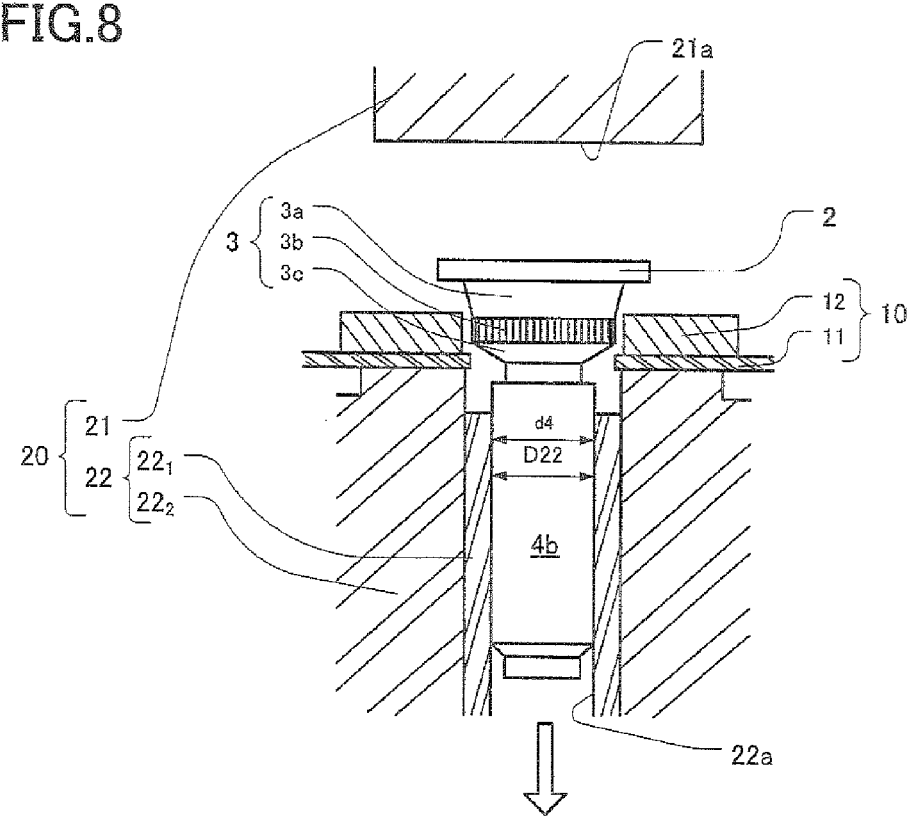
FIG. 8 A diagram that is the first example of the stud bolt attachment structure and shows a state where the stud bolt of the second embodiment is being set in the container.

Next, the stud bolt 1 is set. FIG. 8 shows a state where the stud bolt 1 is in the middle of being set. A diameter D22 of the recessed portion 22a in the movable second mold member $22_2$ of the second mold member 22 is larger than the diameter d4 of the thread portion 4b of the stud bolt 1, so the thread portion 4b is dropped from above and inserted into the recessed portion 22a.

Figure 9:
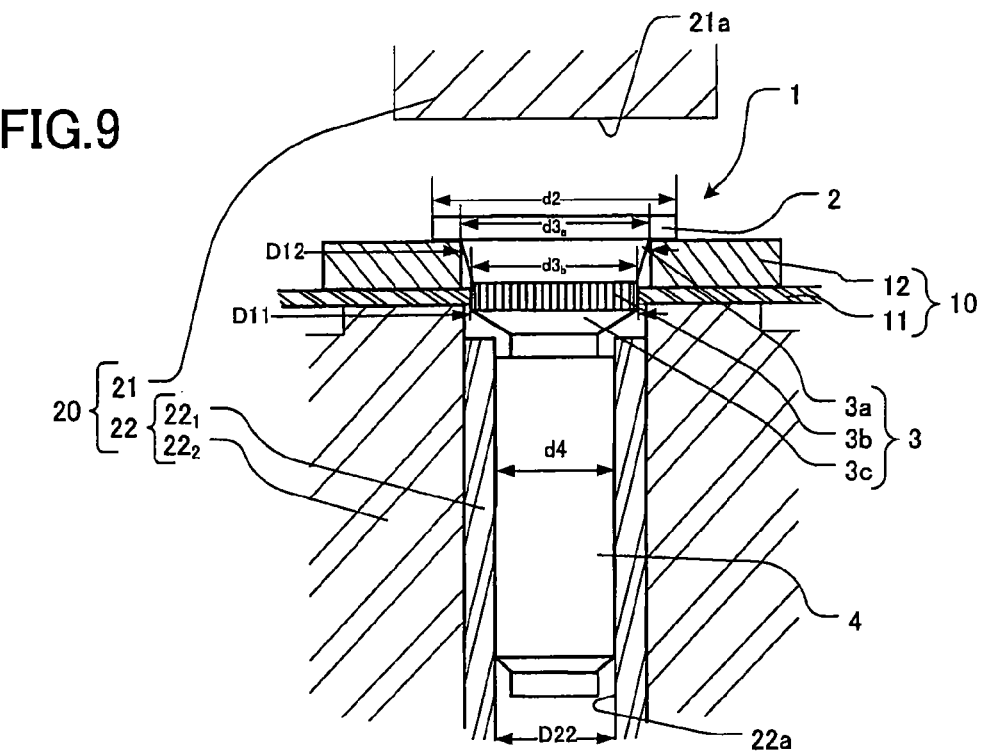
FIG. 9 A diagram that is the first example of the stud bolt attachment structure and shows a state where the stud bolt of the second embodiment has been set in the container.
Figure 10:
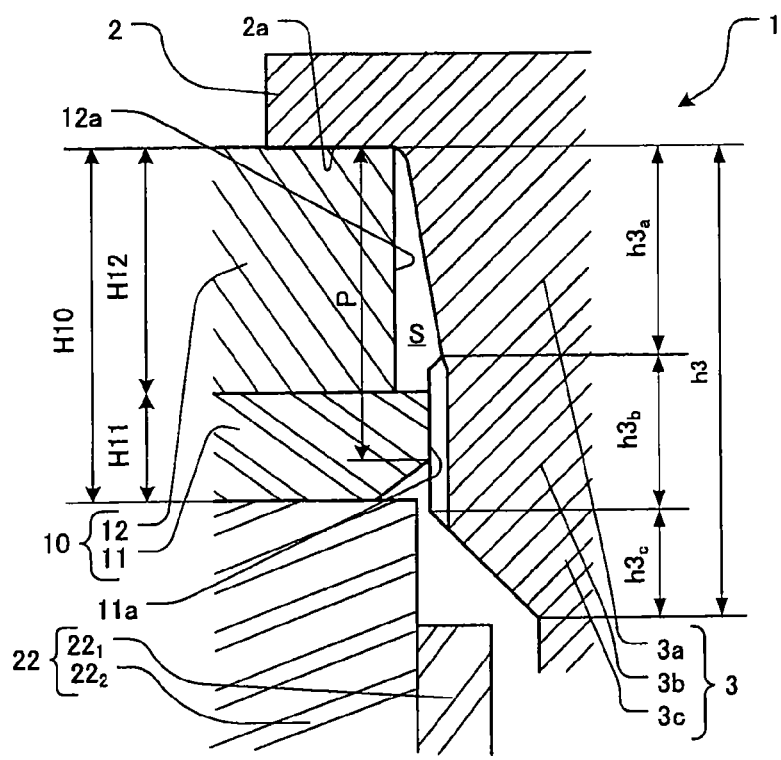
FIG. 10 A diagram where part of FIG. 9 has been enlarged.

FIG. 9 shows a state where the stud bolt 1 has been set, and FIG. 10 shows a diagram where part of FIG. 9 has been enlarged. The stud bolt 1 stops dropping at a position where the stopper portion 2a abuts against the second member 12. In this state, it is not necessary for the staking portion 3c and the second mold member 22 to abut against each other, and a state where the knurling portion 3b is inserted into the hole 11a in the first member 11 is preferable.

It will be noted that, because the staking portion 3c abuts against the first member 11 or the second member 12 and the bolt base portion 3a abuts against the second member 12, there is no problem even if the first member 11 and the second member 12 are not yet aligned.

Here, the hole 11a in the first member 11 has an inner diameter D11 that is substantially the same as or slightly larger than the diameter $d3_b$ of the knurling portion 3b, and the hole 12a in the second member 12 has an inner diameter D12 that is substantially the same as or slightly larger than the diameter $d3_a$ of the bolt base portion 3a on the bolt head portion side. Further, it is preferable for the height h3 of the bolt shoulder portion 3 to be set to be larger than a plate thickness H10 of the container 10 that is equal to the sum of a plate thickness H11 of the first member 11 and a plate thickness H12 of the second member 12 and also for the combined height $h3_a+h3_b$ of the bolt base portion $3_a$ and the knurling portion $3_b$ to be set to be slightly larger than the plate thickness H10 of the container 10.

Figure 11:
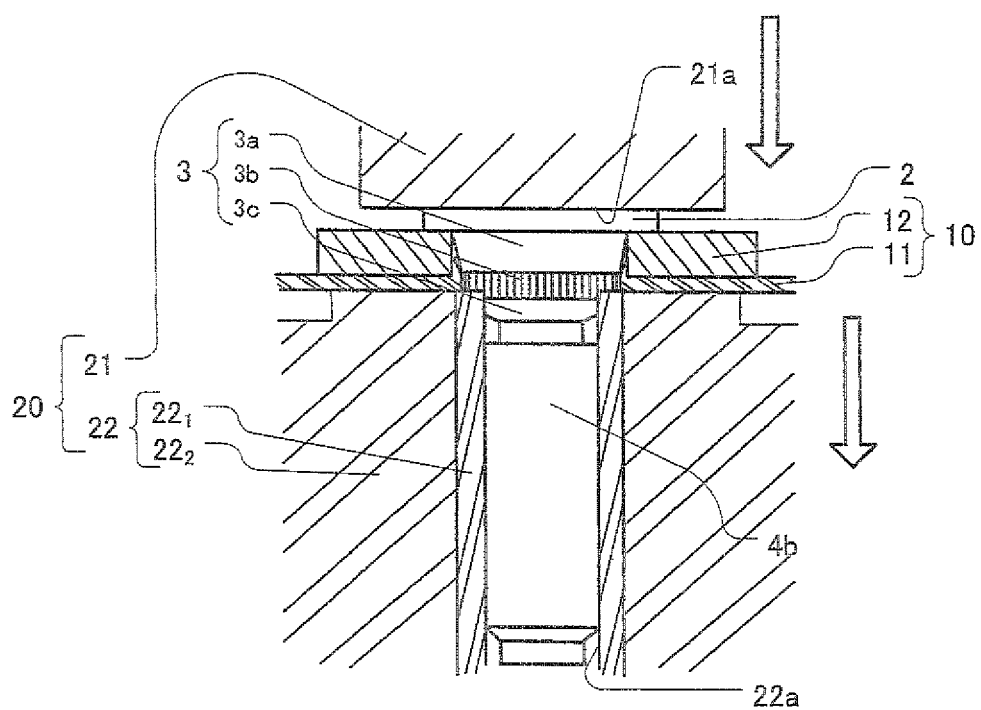
FIG. 11 A diagram that is the first example of the stud bolt attachment structure and shows a state where the stud bolt of the second embodiment is being staked.

Next, as shown in FIG. 11, a first mold member 21 is moved from above in the direction of the arrow and the movable second mold member $22_2$ is moved from above in the direction of the arrow such that a distal end 21a of the first mold member 21 is pushed against and stakes the bolt head portion 2 of the stud bolt 1. When this happens, part of the knurling portion 3b and the staking portion 3c formed on the bolt shoulder portion 3 are crushed by the fixed second mold member $22_1$ such that they become flared on the outer periphery of the bolt shoulder portion 3.

At this time, because the staking portion 3c is formed in a tapered shape or the like that gradually becomes fatter from the coupling portion 4a to the knurling portion 3b side and the bolt base portion 3a is formed in a tapered shape or the like whose diameter gradually becomes larger from the knurling portion 3b side to the bolt head portion 2 side, even if the first member 11 or the second member 12 had abutted against the staking portion 3c or the bolt base portion 3a in a state where the stud bolt 1 has been set, the first member 11 or the second member 12 is automatically centered along the surface of the staking portion 3c in association with the pushing of the first mold member 21, and the axial center of the stud bolt 1 and the centers of the hole 11a in the first member 11 and the hole 12a in the second member 12 substantially coincide and are staked.

Figure 12:
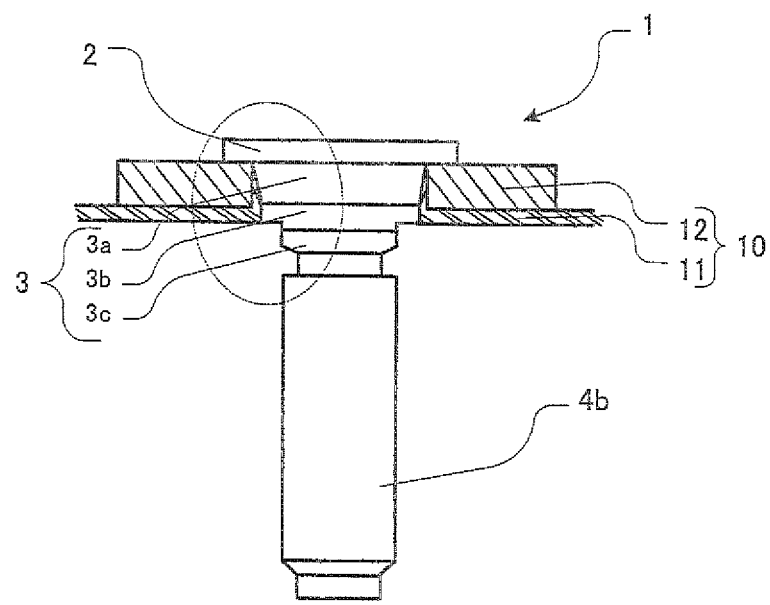
FIG. 12 A diagram that is the first example of the stud bolt attachment structure and shows a state after the stud bolt of the second embodiment has been staked.
Figure 13:
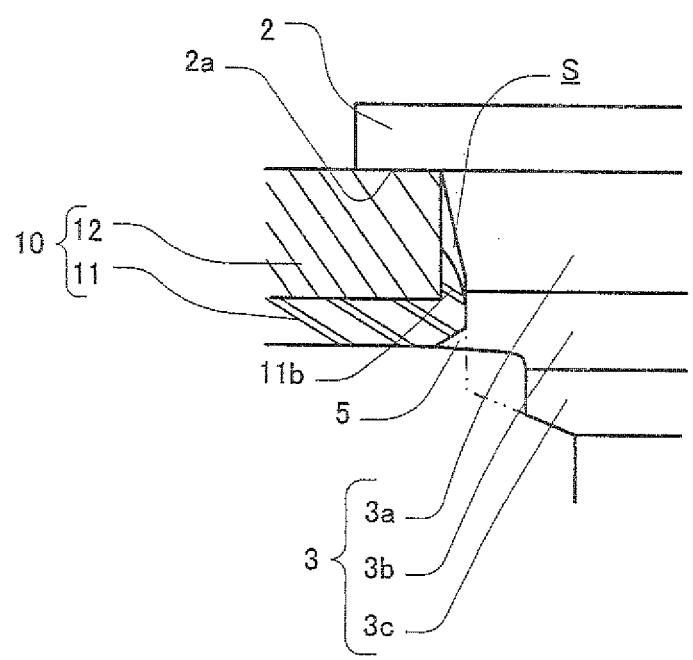
FIG. 13 A diagram that is a second example of the stud bolt attachment structure and shows a state where the stud bolt of the second embodiment has been set in the container.

FIG. 12 is a diagram showing a state after staking where the stud bolt 1 and the container 10 have been removed from a staking jig 20 after the first mold member 21 has been moved, and FIG. 13 is an enlarged diagram of the staked portion indicated by the dotted line in FIG. 12. In this state, a projecting piece 5 that has been formed from part of the knurling portion 3b and the staking portion 3c eats into the first member 11 such that the container 10 is held between the projecting piece 5 and the stopper portion 2a of the bolt head portion 2. At this time, the remaining portion of the knurling portion 3b is crushed, whereby its diameter becomes larger than the diameter D11 of the hole 11a in the first member 11 and the projecting portions 3b, of the knurling portion 3b eat into the first member 11 to deter rotation of the stud bolt 1. Further, the bolt base portion 3a is also crushed, whereby its diameter becomes larger.

Moreover, a staking portion 11b of the first member 11 becomes caught in a gap S between the second member 12 and the bolt base portion 3a of the stud bolt 1, is held between the stud bolt 1 and the second member 12, and is staked and fastened.

Additionally, the bolt head portion 2 side of the stud bolt 1 that corresponds to the inside of the container 10 and the end portion 4c side of the bolt shaft portion 4 of the stud bolt 1 that corresponds to the outside of the container 10 are isolated from each other such that the container 10 can be held in a sealed state.

In this manner, the stud bolt 1, the first member 11 and the second member 12 are automatically aligned during the work of staking, so preliminary work such as welding for alignment becomes unnecessary, productivity improves, and low costs can be realized. Further, the gap S between the stud bolt 1 and the first member 11 and the second member 12 is staked so as to become substantially uniform on the circumference of a circle, so a force that is substantially uniform on the circumference of a circle acts during the work of staking such that a substantially uniform joining force can be obtained, variations in joint strength can be reduced such that stable hermetic seal can be ensured, the percentage of defects decreases, productivity improves, and low costs can be realized. Moreover, because the first member 11 becomes caught and is fastened in the gap S between the second member 12 and the bolt base portion 3a of the stud bolt 1 during the work of staking, joint strength becomes larger.

Next, a second example of the stud bolt attachment structure will be described using the drawings. As for the reference numerals in the drawings, identical reference numerals will be given to portions that are shared in common with those of the first example.

FIG. 14 to FIG. 18 are diagrams showing a second example of a process of staking the stud bolt 1 of the structure in FIG. 6 to the container 10 that comprises the first member 11 and the second member 12 and the like.

Figure 14:
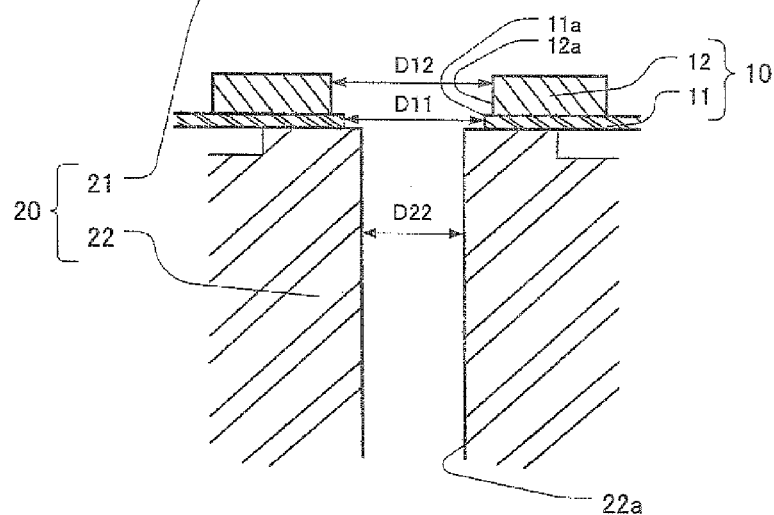
FIG. 14 A diagram that is the second example of the stud bolt attachment structure and shows a state where the stud bolt of the second embodiment is being set in the container.

FIG. 14 shows a state where the container 10 has been set on the second mold member 22.

The second mold member 22 includes the recessed portion 22a that is a cylindrical space that is slightly larger than the diameter d4 of the thread portion 4b formed on the bolt shaft portion 4 of the stud bolt 1 and has a depth that is longer than the height of the bolt shaft portion 4. It will be noted that, in the present example, the upper surface of the second mold member 22 is formed in a convex shape, but it may also be a flat surface.

Further, the first member 11 and the second member 12 are respectively disposed with holes 11a and 12a that the stud bolt 1 penetrates, and the hole 11a in the first member 11 and the hole 12a in the second member 12 are formed so as to be larger than the diameter d4 of the thread portion 4b formed on the bolt shaft portion 4.

First, the first member 11 is set on the second mold member 22, and then the second member 12 is set on the first member 11. When setting the container 10, it is not necessary to strictly align the container 10; it suffices to set the container 10 such that there is an opening of a dimension that is at least equal to or greater than d4 through which the stud bolt 1 can be inserted. Further, it is also not necessary to perform temporary fixing such as welding.

Figure 15:
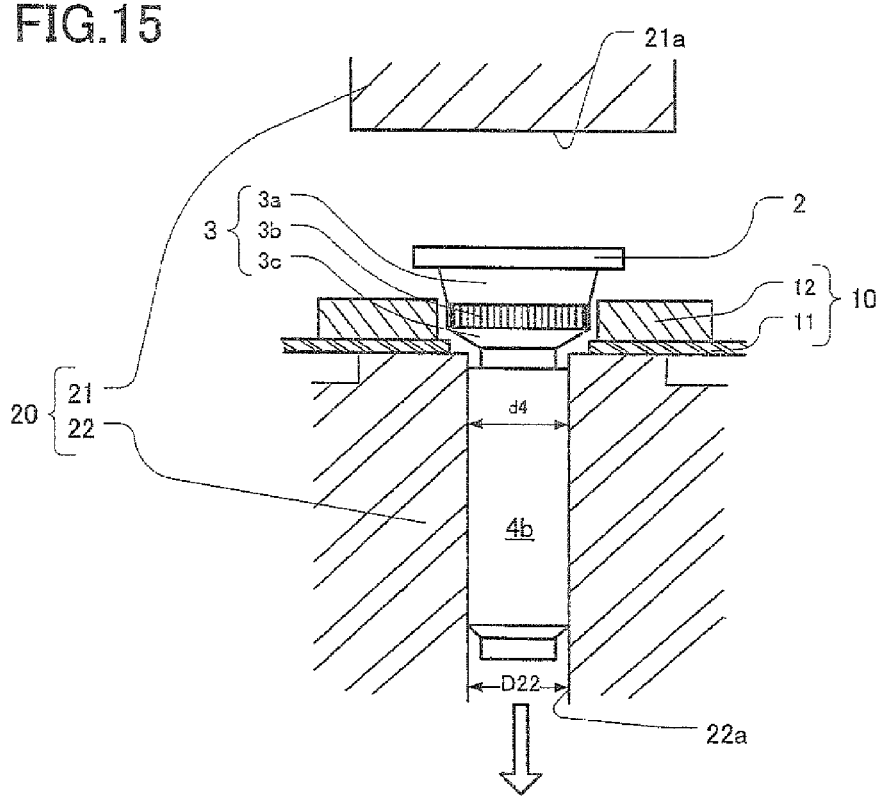
FIG. 15 A diagram that is the second example of the stud bolt attachment structure and shows a state where the stud bolt of the second embodiment has been set in the container.

Next, the stud bolt 1 is set. FIG. 15 shows a state where the stud bolt 1 is in the middle of being set. The diameter D22 of the recessed portion 22a in the second mold member 22 is larger than the diameter d4 of the thread portion 4b of the stud bolt 1, so the thread portion 4b is dropped from above and inserted into the recessed portion 22a.

Figure 16:
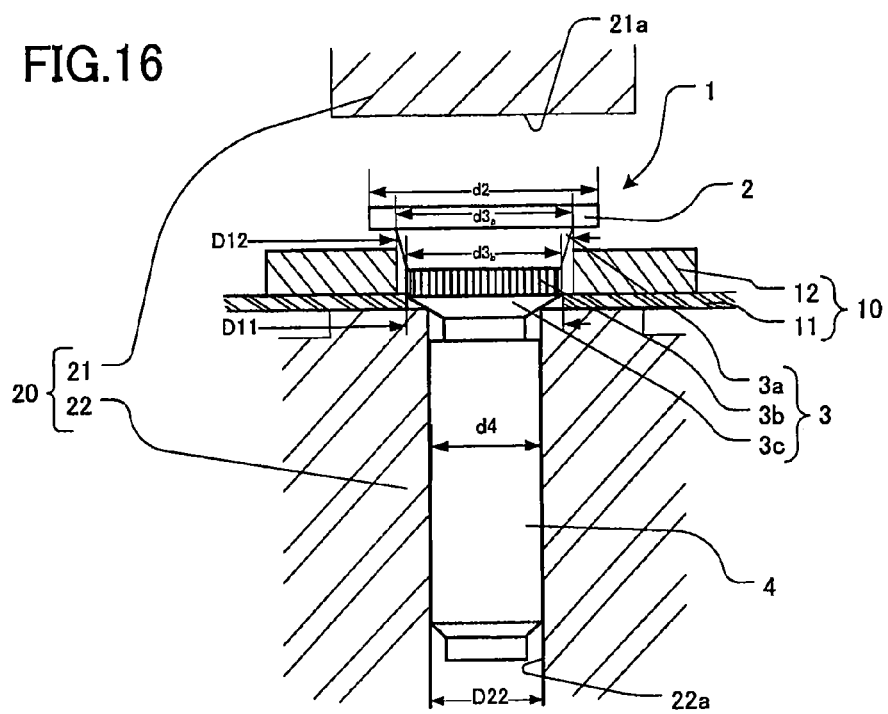
FIG. 16 A diagram where part of FIG. 14 has been enlarged.
Figure 17:
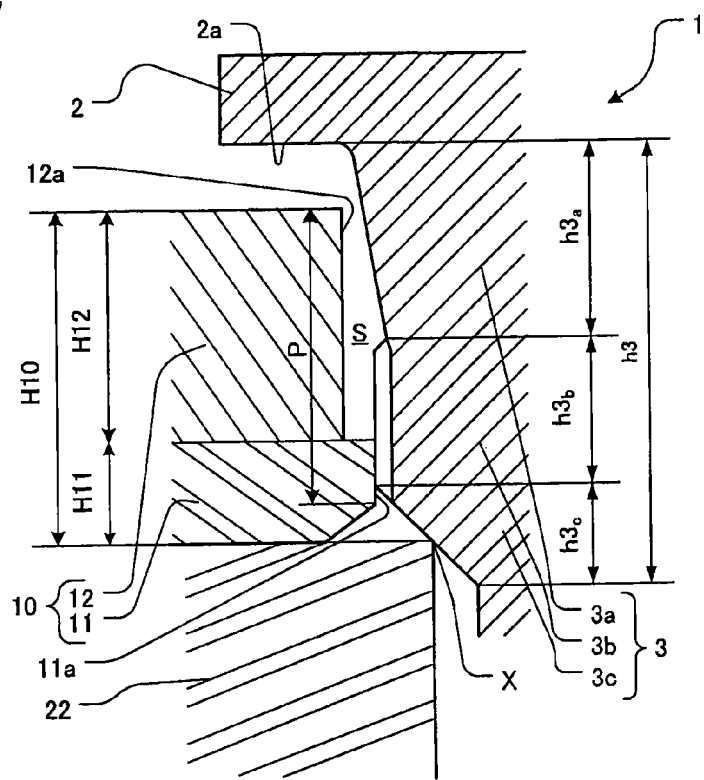
FIG. 17 A diagram that is the second example of the stud bolt attachment structure and shows a state where the stud bolt of the second embodiment is being staked.
Figure 18:
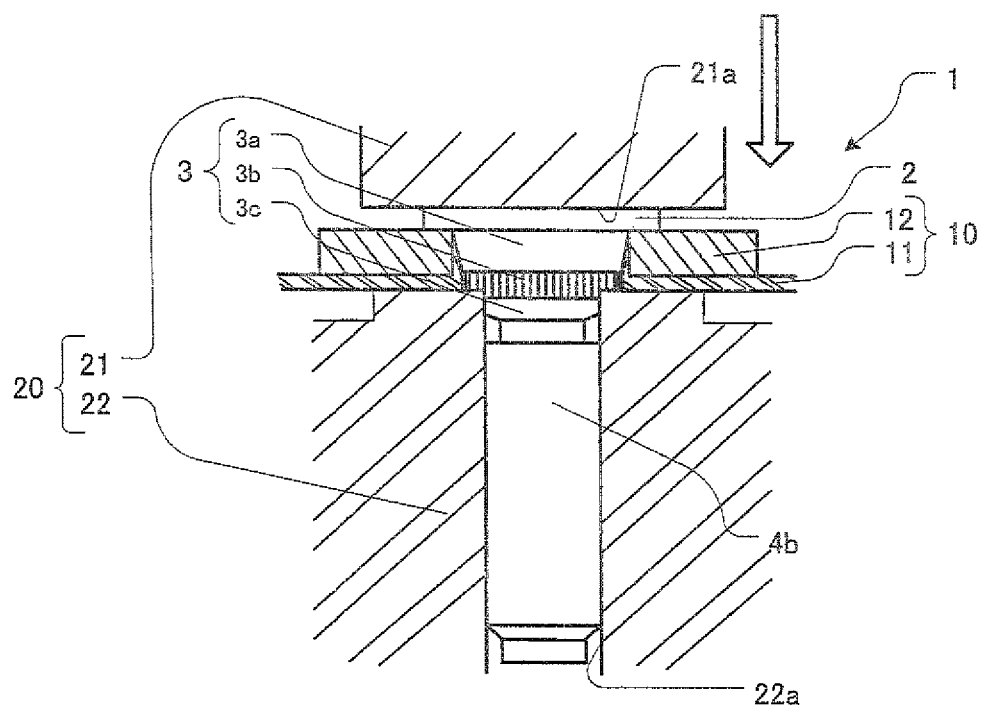
FIG. 18 A diagram where part of FIG. 17 has been enlarged.

FIG. 16 shows a state where the stud bolt 1 has been set, and FIG. 17 shows a diagram where part of FIG. 16 has been enlarged. The stud bolt 1 stops dropping at a position where the staking portion 3c abuts against the second mold member 22. In this state, the distance from an abutment portion X between the staking portion 3c and the second mold member 22 to the stopper portion 2a of the bolt head portion 2 is larger than the plate thickness H10 of the container 10 that is equal to the sum of the plate thickness H11 of the first member 11 and the plate thickness H12 of the second member 12, so the stopper portion 2a does not contact the second member 12, and the first member 11 and the second member 12 are not yet aligned. Further, there is no problem even if the staking portion 3c abuts against the first member 11 or the second member 12 and the bolt base portion 3a abuts against the second member 12, but it is preferable for the staking portion 3c to abut against the second mold member 22 and for the knurling portion 3b to be inserted into the hole 11a in the first member 11 such that the bolt base portion 3a is in a state of non-contact in the stud bolt 1.

Here, the hole 11a in the first member 11 has the inner diameter D11 that is substantially the same as or slightly larger than the diameter $d3_b$ of the knurling portion 3b, and the hole 12a in the second member 12 has the inner diameter D12 that is substantially the same as or slightly larger than the diameter $d3_a$ of the bolt base portion 3a on the bolt head portion side. Further, it is preferable for the height h3 of the bolt shoulder portion 3 to be set to be larger than the plate thickness H10 of the container 10 that is equal to the sum of the plate thickness H11 of the first member 11 and the plate thickness H12 of the second member 12 and also for the combined height $h3_a + h3_b$ of the bolt base portion $h3_a$ and the knurling portion $h3_b$ to be set to be slightly larger than the plate thickness H10 of the container 10.

Next, as shown in FIG. 1S, the first mold member 21 is moved from above in the direction of the arrow such that the distal end 21a of the first mold member 21 is pushed against and stakes the bolt head portion 2 of the stud bolt 1. When this happens, part of the knurling portion 3b and the staking portion 3c formed in the bolt shoulder portion 3 are crushed by the second mold member 22 such that they become flared on the outer periphery of the bolt shoulder portion 3.

At this time, because the staking portion 3c is formed in a tapered shape or the like that gradually becomes fatter from the coupling portion 4a to the knurling portion 3b side and the bolt base portion 3a is formed in a tapered shape or the like whose diameter gradually becomes larger from the knurling portion 3b side to the bolt head portion 2 side, even if the first member 11 or the second member 12 had abutted against the staking portion 3c or the bolt base portion 3a in a state where the stud bolt 1 has been set, the first member or the second member 12 is automatically centered along the surface of the staking portion 3c in association with the pushing of the first mold member 21, and the axial center of the stud bolt 1 and the centers of the hole 11a in the first member 11 and the hole 12a in the second member 12 substantially coincide and are staked. The state after staking is, as shown in FIG. 12 and FIG. 13, the same as that of the first example.

In this manner, the stud bolt 1, the first member 11 and the second member 12 are automatically aligned during the work of staking, so preliminary work such as welding for alignment becomes unnecessary, productivity improves, and low costs can be realized. Further, the gap S between the stud bolt 1 and the first member 11 and the second member 12 is staked so as to become substantially uniform on the circumference of a circle, so a force that is substantially uniform on the circumference of a circle acts during the work of staking such that a substantially uniform join force can be obtained, variations in joint strength can be alleviated such that stable hermetic seal can be ensured, the percentage of defects decreases, productivity improves, and low costs can be realized. Moreover, because the first member 11 becomes caught and is fastened in the gap S between the second member 12 and the bolt base portion 3a of the stud bolt 1 during the work of staking, joint strength becomes larger.

Next, a third example of the stud bolt attachment structure of the present invention will be described using the drawings. As for the reference numerals, identical reference numerals will be given to portions that are shared in common with those of the first example.

Figure 19:
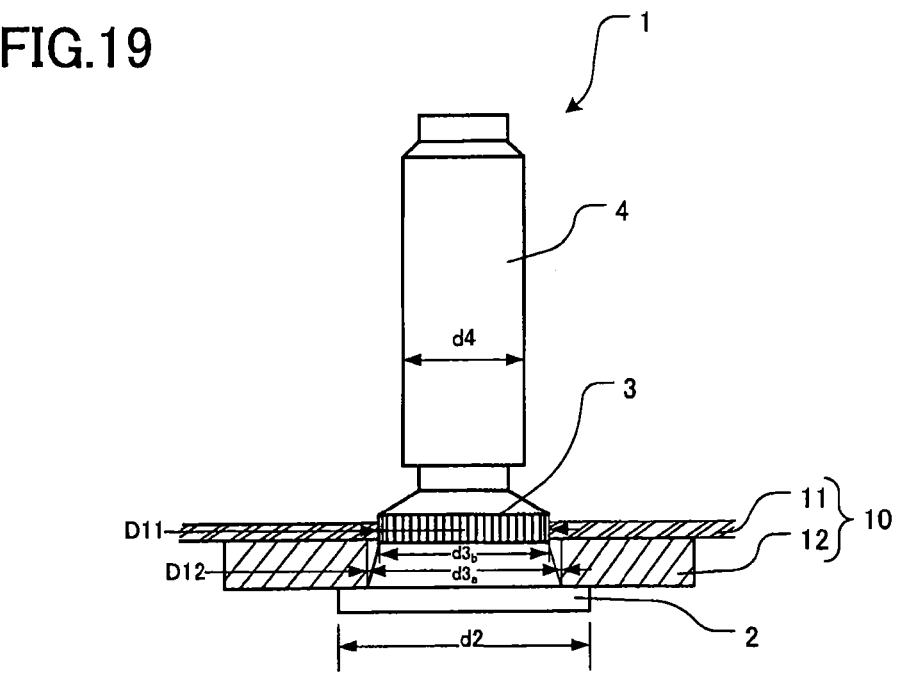
FIG. 19 A diagram that is a third example of the stud bolt attachment structure and shows a state where the stud bolt of the second embodiment has been set in the container.
Figure 20:
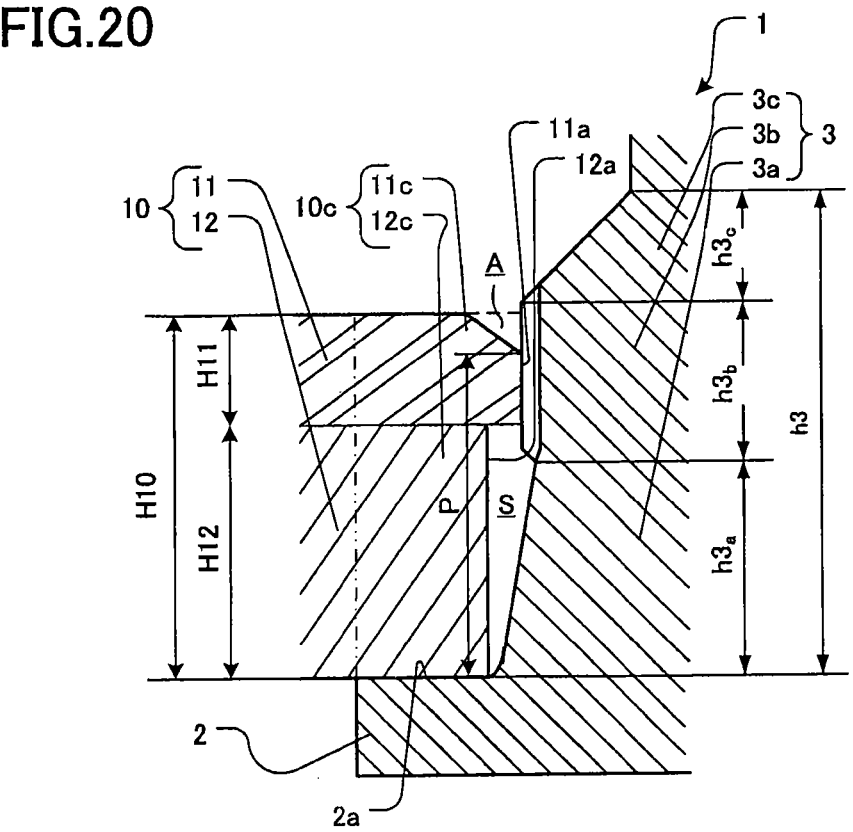
FIG. 20 A diagram where part of FIG. 19 has been enlarged.

FIG. 19 to FIG. 24 are diagrams showing a third example of a process of staking the stud bolt 1 of the structure in FIG. 6 to the container 10 that comprises the first member 11 and the second member 12 and the like. FIG. 19 shows a state where the container 10 has been set on the stud bolt 1, and FIG. 20 shows a diagram where part thereof has been enlarged.

A staking portion 10c of the container 10 is a portion with a plate thickness H10 that comprises the first member 11 and the second member 12. A staking portion 11c of the first member 11 is a plate-shaped portion with a plate thickness H11 that is thinner than the height $h3_b$ of the knurling portion 3b, and a hole 11a with an inner diameter D11 that is substantially the same as or slightly larger than the diameter $d3_b$ of the knurling portion 3b and smaller than the diameter d2 of the bolt head portion 2 is formed therein. There is a chamfered portion A on the upper side of the hole 11a in FIG. 20.

A staking portion 12c of the second member 12 is a plate-shaped portion with a plate thickness H12 that is thicker than the height $h3_a$ of the bolt head portion 3a, and a hole 12a with an inner diameter D12 that is substantially the same as or slightly larger than the diameter d3, of the bolt base portion 3a on the bolt head portion side and smaller than the diameter d2 of the bolt head portion 2 is formed therein.

First, as shown in FIG. 19, the second member 12 is placed on the stud bolt 1 that has been set beforehand. At this time, because the hole 12a in the second member has the inner diameter D12 that is substantially the same as or slightly larger than the diameter $d3_a$ of the bolt base portion 3a on the bolt head portion side and the bolt base portion 3a is formed in a tapered shape or the like whose diameter gradually becomes larger from the knurling portion 3b side to the bolt head portion 2 side, when the second member 12 is placed from above the stud bolt 1, the second member 12 is automatically aligned along the surface of the bolt base portion 3a, and the axial center of the stud bolt 1 and the center of the hole 12a in the second member 12 substantially coincide.

Further, because the hole 11a in the first member 11 has the inner diameter D11 that is substantially the same as or slightly larger than the diameter $d3_b$ of the knurling portion 3b and the staking portion 3c is formed in a tapered shape or the like that gradually becomes fatter from the coupling portion 4a to the knurling portion 3b side, when the first member 11 is placed from above the stud bolt 1, the first member 11 is automatically aligned along the surface of the staking portion 3c, and the axial center of the stud bolt 1 and the center of the hole 11b in the first member 11 substantially coincide. At this time, a gap S is formed between the stud bolt 1, the first member 11 and the second member 12.

By placing in this manner, the gap S between the stud bolt 1, the first member 11 and the second member 12 becomes substantially uniform on the circumference of a circle, preliminary work such as welding for alignment becomes unnecessary, productivity improves, and low costs can be realized.

The combined height $h3_a+h3_b$ of the bolt base portion 3a and the knurling portion 3b is larger than the plate thickness H10 of the container 10, so the staking portion 3c of the bolt shoulder portion 3 penetrates the container 10 and projects. Further, the height $h3_a$ of the bolt base portion 3a of the bolt shoulder portion 3 is set to be smaller than the plate thickness D12 of the second member 12.

Figure 21:
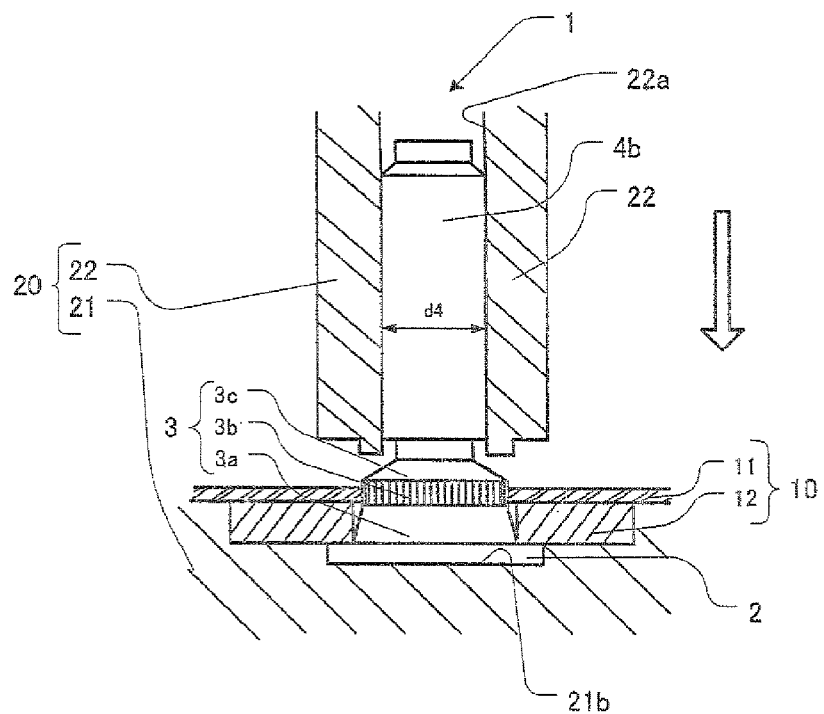
FIG. 21 A diagram that is the third example of the stud bolt attachment structure and shows a state before the stud bolt of the second embodiment is staked.

As shown in FIG. 21, the container 10 in a state where the stud bolt 1 has been passed therethrough is set in the staking jig 20 that includes the first mold member 21 and the second mold member 22. The first mold member 21 includes a recessed portion 21b that corresponds to the shape of the bolt head portion 2 of the stud bolt 1, and when the container 10 is to be set, the bolt head portion 2 of the stud bolt 1 is placed in, so as to fit together with, this recessed portion 21b. The second mold member 22 includes the cylindrical recessed portion 22a that is slightly larger than the diameter d4 of the thread portion 4b formed on the bolt shaft portion 4 of the stud bolt 1 and has a depth that is longer than the height of the bolt shaft portion 4, and when the container 10 is to be set, the bolt shaft portion 4 of the stud bolt 1 is placed in, so as to fit together with, this recessed portion 22a.

Figure 22:
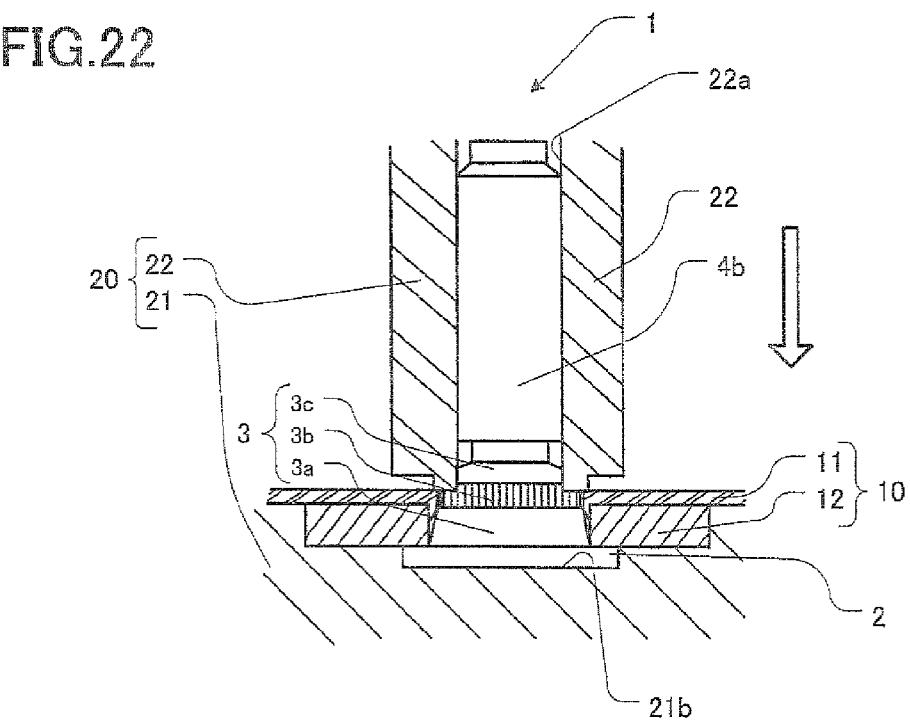
FIG. 22 A diagram that is the third example of the stud bolt attachment structure and shows a state where the stud bolt of the second embodiment is being staked.

Next, as shown in FIG. 22, the second mold member 22 is moved in the direction of the arrow such that the distal end of the second mold member 22 pushes against and stakes the staking portion 3c formed on the bolt shoulder portion 3 of the stud bolt 1. When this happens, part of the knurling portion 3b and the staking portion 3c formed on the bolt shoulder portion 3 are crushed by the second mold member 22 such that they become flared on the outer periphery of the bolt shoulder portion 3.

Figure 23:
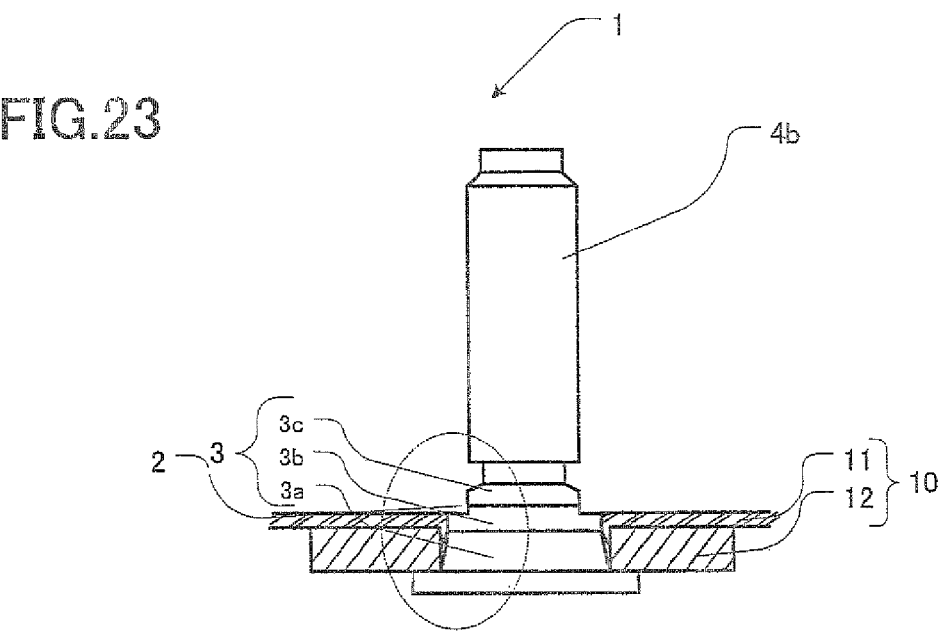
FIG. 23 A diagram that is the third example of the stud bolt attachment structure and shows a state after the stud bolt of the second embodiment has been staked.
Figure 24:
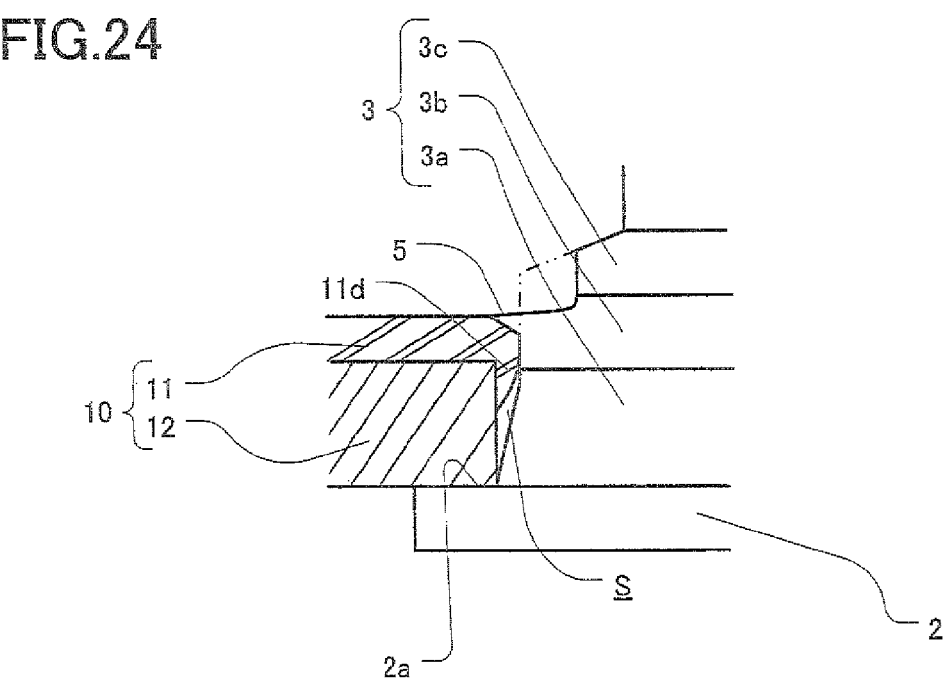
FIG. 24 A diagram where part of FIG. 23 has been enlarged.

FIG. 23 is a diagram showing a state after staking where the stud bolt 1 and the container 10 have been removed from the staking jig 20 after the second mold member 22 has been further moved in the direction of the arrow until the second mold member 22 abuts against the first member 11, and FIG. 24 is an enlarged diagram of the staked portion indicated by the dotted line in FIG. 23. In this state, a projecting piece 5 that has been formed from part of the knurling portion 3b and the staking portion 3c eats into the first member 11 such that the container 10 is held between the projecting piece 5 and the stopper portion 2a of the bolt head portion 2. At this time, the remaining portion of the knurling portion 3b is crushed, whereby its diameter becomes larger than the diameter D11 of the hole 11b in the first member 11 and the projecting portions $3b_1$ of the knurling portion 3b eat into the first member 11 to deter rotation of the stud bolt 1. Further, the bolt base portion 3a is also crushed, whereby its diameter becomes larger.

Moreover, a staking portion 11d of the first member 11 becomes caught in the gap S between the second member 12 and the bolt base portion 3a of the stud bolt 1, is held between the stud bolt 1 and the second member 12, and is staked and fastened.

Additionally, the bolt head portion 2 side of the stud bolt 1 that corresponds to the inside of the container 10 and the end portion 4c side of the bolt shaft portion 4 of the stud bolt 1 that corresponds to the outside of the container 10 are isolated from each other such that the container 10 can be held in a sealed state.

In this manner, the gap between the stud bolt 1, the first member 11 and the second member 12 is placed so as to become substantially uniform on the circumference of a circle, whereby a force that is substantially uniform on the circumference of a circle acts during the work of staking such that a substantially uniform joining force can be obtained, variations in joint strength can be alleviated such that stable hermetic seal can be ensured, the percentage of defects decreases, and productivity improves. Further, because the first member 11 becomes caught and is fastened in the gap S between the second member 12 and the bolt base portion 3a of the stud bolt 1 during the work of staking, joint strength becomes larger.

Figure 25:
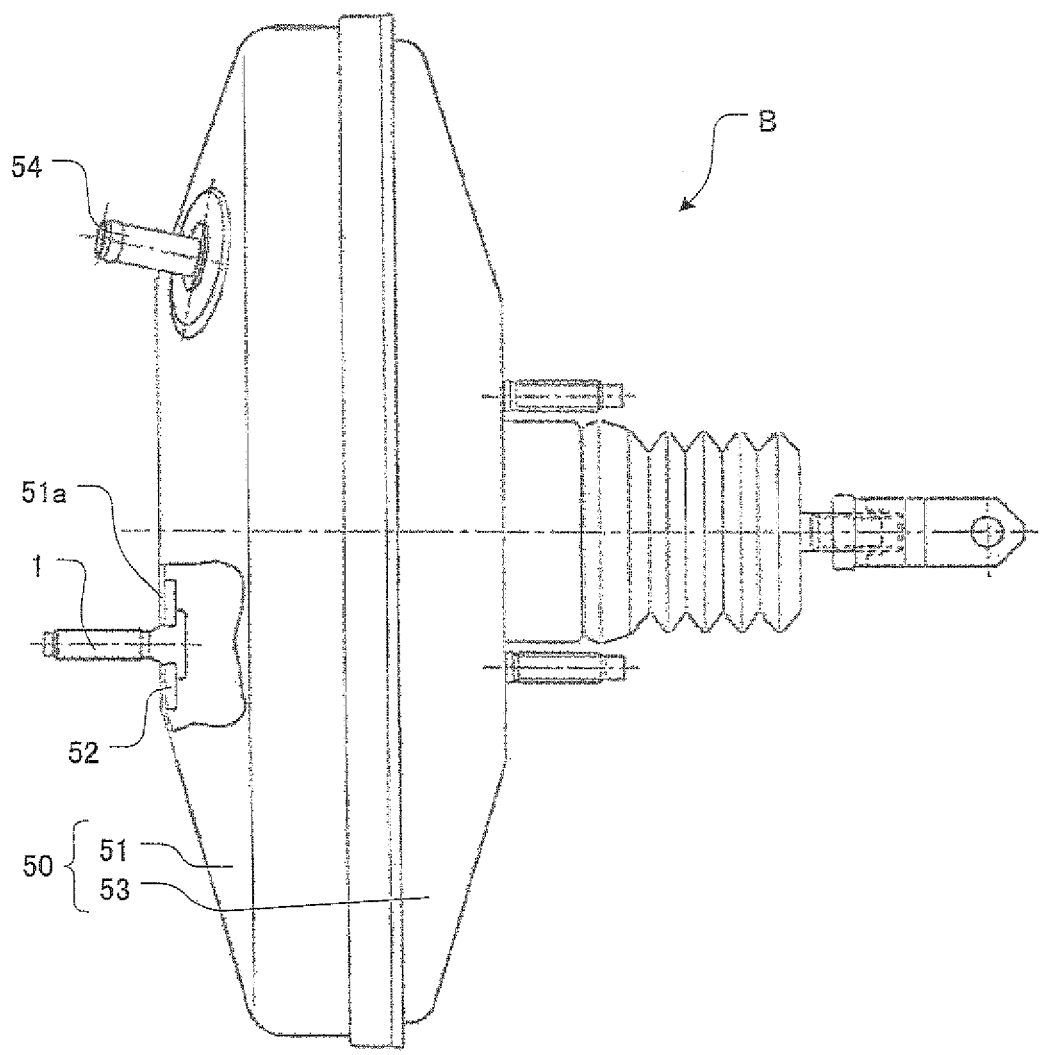
FIG. 25 A diagram where the stud bolt and the stud bolt attachment structure are applied to a brake booster device.
Figure 26:
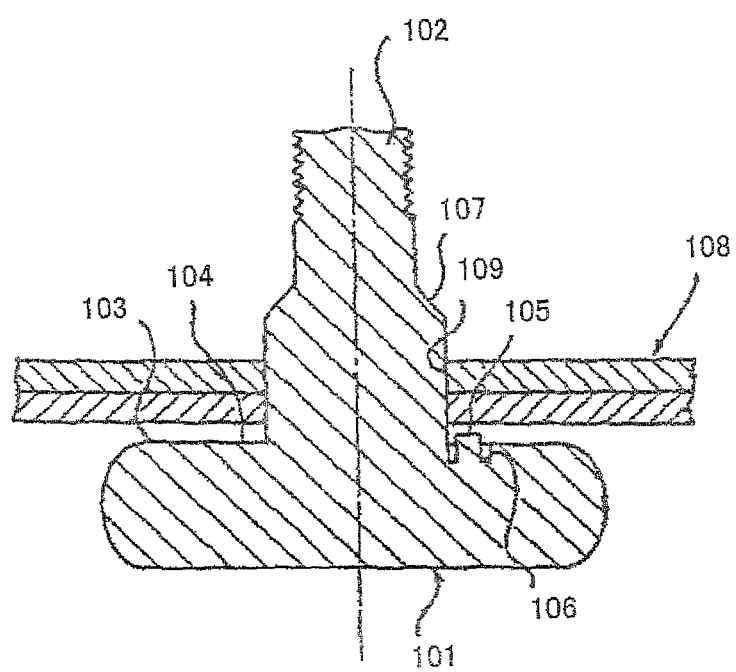
FIG. 26 A diagram showing prior art.
Figure 27:
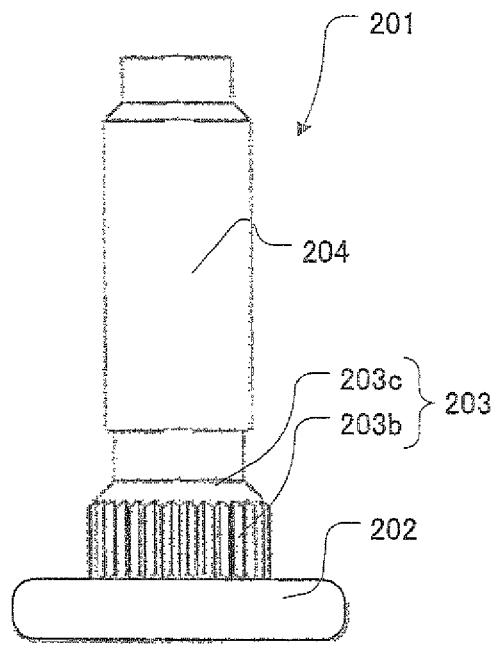
FIG. 27 A diagram showing prior art.
Figure 28:
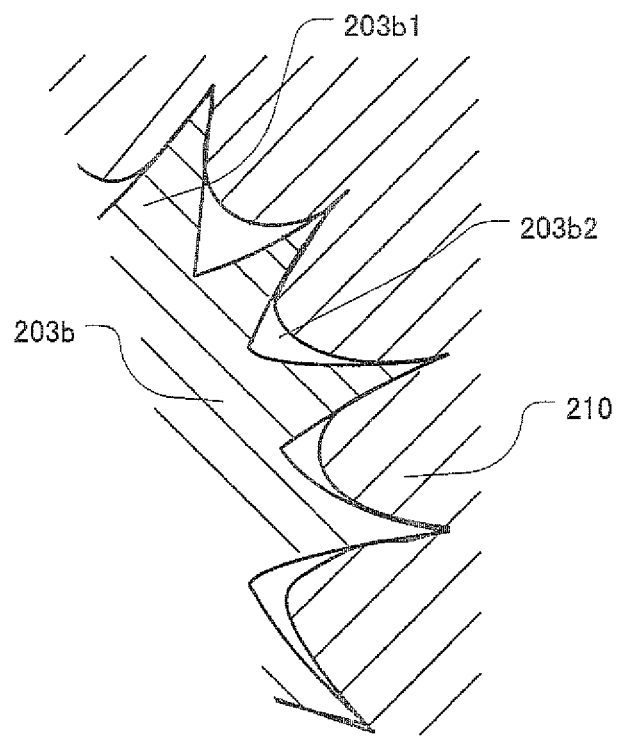
FIG. 28 A diagram showing prior art.

FIG. 25 shows a state where the stud bolt 1 is applied to a front shell 51 that serves as an example of a first member of the present invention of a brake booster device B. The brake booster device B is disposed with a shell 50 that serves as an example of the container 10 of the present invention that is formed from the front shell 51 and a rear shell 53. On the front side of the shell 50, a constant pressure chamber is sectioned by the front shell 51 and an unillustrated diaphragm, and in this constant pressure chamber, negative pressure is introduced through a negative pressure introduction passage 54 such that the constant pressure chamber is sealed in a state where pressure (atmospheric pressure) is applied from the outside.

As for the stud bolt 1, the bolt shoulder portion 3 and the bolt shaft portion 4 of the stud bolt 1 are caused to penetrate to the outside from the inside of the front shell 51, and an unillustrated master cylinder is attached to the brake booster device B by the thread portion 4b of the bolt shaft portion 4. At that time, a support plate 52 that serves as an example of a second member of the present invention is placed on a staking portion 51a of the front shell 51.

In this manner, by applying the stud bolt 1 shown in FIG. 1 or FIG. 6 to the front shell 51 of the brake booster device B, hermetic seal is held with high precision between the constant pressure chamber of the front shell 51 of the shell 50 and the outside.

It will be noted that it is not invariably necessary for the container 10 to include the first member 11 and the second member 12; the container 10 may also include just the first member 11.

INDUSTRIAL APPLICABILITY

In the stud bolt that is configured in this manner, the manufacturing process and costs do not change from what has conventionally been the case, and the performance of holding the hermetic seal of the container and the like can be improved.

Further, the stud bolt that has this high-precision hermetic seal is used in the booster device, so both the manufacturing process and costs do not change that much from what has conventionally been the case, and the performance of the booster device improves.

Moreover, in the stud bolt attachment structure, preliminary work such as welding for alignment becomes unnecessary, productivity improves, and low costs can be realized. Further, variations in joint strength can be alleviated such that stable hermetic seal can be ensured, the percentage of defects decreases, and productivity improves. Further, joint strength becomes larger.

Further, the stud bolt attachment structure that has this high-precision hermetic seal is used in the booster device, so both the manufacturing process and costs do not change that much from what has conventionally been the case, and the performance of the booster device improves.

The invention claimed is:

1. A stud bolt attachment structure comprising a stud bolt and a container including a first member and a second member, wherein the stud bolt penetrates the container to join together the first member and the second member, where there is a difference in pressure between inside and outside the container;
    the stud bolt being disposed with a bolt head portion, a bolt shoulder portion whose diameter is smaller than a diameter of the bolt head portion, and a thread portion whose diameter is smaller than the diameter of the bolt shoulder portion, wherein the bolt shoulder portion includes a knurling portion that includes projecting portions and groove portions on its outer periphery, at least part of the knurling portion eats into the container during staking, and the bolt shoulder portion includes a bolt base portion that is disposed between the knurling portion and the bolt head portion and whose diameter gradually becomes larger from a knurling portion side of the bolt base portion to a bolt head portion side of the bolt base portion; and
    the first member and the second member are disposed with holes that the stud bolt penetrates, a diameter of the hole in the first member is formed so as to be substantially the same as or slightly larger than a diameter of the knurling portion, and a diameter of the hole in the second member is formed so as to be substantially the same as or slightly larger than the diameter of the bolt base portion on the bolt head portion side thereof.

2. A stud bolt attachment structure according to claim 1, wherein a gap is provided between the hole of the second member and the bolt base portion such that the first member is caught in the gap during caulking.

3. A booster including the stud bolt attachment structure according to claim 2, wherein the first member is a front shell of the booster and the second member is a support plate.

4. A stud bolt attachment structure comprising a stud bolt and a container including a first member and a second member, wherein the stud bolt penetrates the container to join together the first member and the second member, where there is a difference in pressure between inside and outside the container;
    the stud bolt being disposed with a bolt head portion, a bolt shoulder portion whose diameter is smaller than a diameter of the bolt head portion, and a thread portion whose diameter is smaller than the diameter of the bolt shoulder portion, wherein the bolt shoulder portion includes a knurling portion that includes projecting portions and groove portions on its outer periphery, at least part of the knurling portion eats into the container during staking, and the bolt shoulder portion includes a bolt base portion that is disposed between the knurling portion and the bolt head portion and whose diameter gradually becomes larger from a knurling portion side of the bolt base portion to a bolt head portion side of the bolt base portion; and the first member and the second member are disposed with holes that the stud bolt penetrates, the bolt base portion having a height smaller than the height from a surface of the container abutting the bolt head portion to a chamfered portion of the hole formed in the first member and the second member.

5. A stud bolt attachment structure according to claim 4, wherein a gap is provided between the hole of the second member and the bolt base portion such that the first member is caught in the gap during caulking.

6. A booster including the stud bolt attachment structure according to claim 5, wherein the first member is a front shell of the booster and the second member is a support plate.

7. A stud bolt attachment structure comprising a stud bolt and a container including a first member and a second member, wherein the stud bolt penetrates the container to join together the first member and the second member, where there is a difference in pressure between inside and outside the container;

the stud bolt being disposed with a bolt head portion, a bolt shoulder portion whose diameter is smaller than a diameter of the bolt head portion, and a thread portion whose diameter is smaller than the diameter of the bolt shoulder portion, wherein the bolt shoulder portion includes a knurling portion that includes projecting portions and groove portions on its outer periphery, at least part of the knurling portion eats into the container during staking, and the bolt shoulder portion includes a bolt base portion that is disposed between the knurling portion and the bolt head portion and whose diameter gradually becomes larger from a knurling portion side of the bolt base portion to a bolt head portion side of the bolt base portion; and the first member and the second member are disposed with holes that the stud bolt penetrates, the bolt base portion having a height smaller than the plate thickness of the staking portion of the container.

8. A stud bolt attachment structure according to claim 7, wherein a gap is provided between the hole of the second member and the bolt base portion such that the first member is caught in the gap during caulking.

9. A booster including the stud bolt attachment structure according to claim 8, wherein the first member is a front shell of the booster and the second member is a support plate.

10. A stud bolt attachment structure comprising a stud bolt and a container including a first member and a second member, wherein the stud bolt penetrates the container to join together the first member and the second member, where there is a difference in pressure between inside and outside the container;

the stud bolt being disposed with a bolt head portion, a bolt shoulder portion whose diameter is smaller than a diameter of the bolt head portion, and a thread portion whose diameter is smaller than the diameter of the bolt shoulder portion, wherein the bolt shoulder portion includes a knurling portion that includes projecting portions and groove portions on its outer periphery, at least part of the knurling portion eats into the container during staking, and the bolt shoulder portion includes a bolt base portion that is disposed between the knurling portion and the bolt head portion and whose diameter gradually becomes larger from a knurling portion side of the bolt base portion to a bolt head portion side of the bolt base portion; and the first member and the second member are disposed with holes that the stud bolt penetrates, the bolt base portion having a height smaller than the height from a surface of the container abutting the bolt head portion to a chamfered portion of the hole formed in the first member and the second member;

the bolt shoulder portion being larger than the plate thickness of the staking portion of the container.

11. A stud bolt attachment structure according to claim 10, wherein a gap is provided between the hole of the second member and the bolt base portion such that the first member is caught in the gap during caulking.

12. A booster including the stud bolt attachment structure according to claim 11, wherein the first member is a front shell of the booster and the second member is a support plate.

* * * * *